US011862134B2

(12) United States Patent
Nishimura et al.

(10) Patent No.: US 11,862,134 B2
(45) Date of Patent: Jan. 2, 2024

(54) KEY SUPPORT STRUCTURE OF KEYBOARD DEVICE

(71) Applicant: YAMAHA CORPORATION, Hamamatsu (JP)

(72) Inventors: Tetsuya Nishimura, Hamamatsu (JP); Naoki Nishimura, Hamamatsu (JP); Yuji Takahashi, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 277 days.

(21) Appl. No.: 17/179,513

(22) Filed: Feb. 19, 2021

(65) Prior Publication Data

US 2021/0295808 A1 Sep. 23, 2021

(30) Foreign Application Priority Data

Mar. 23, 2020 (JP) ................................ 2020-050877

(51) Int. Cl.
*G10H 1/34* (2006.01)
*G10C 3/12* (2006.01)
*G10C 3/04* (2006.01)

(52) U.S. Cl.
CPC ............... *G10H 1/346* (2013.01); *G10C 3/04* (2013.01); *G10C 3/12* (2013.01); *G10H 2220/221* (2013.01)

(58) Field of Classification Search
CPC .... G10H 1/346; G10H 2220/221; G10C 3/04; G10C 3/12
See application file for complete search history.

(56) References Cited

U.S. PATENT DOCUMENTS

| | | | | |
|---|---|---|---|---|
| 2004/0159202 A1* | 8/2004 | Niitsuma | ................. | G10C 9/00 84/174 |
| 2018/0286369 A1* | 10/2018 | Ichiki | ..................... | G10H 1/346 |
| 2019/0043463 A1* | 2/2019 | Ichiki | ....................... | G10H 1/34 |
| 2019/0251939 A1 | 8/2019 | Ichiki | | |

FOREIGN PATENT DOCUMENTS

| | | | | |
|---|---|---|---|---|
| CN | 107221309 A | 9/2017 | | |
| CN | 108694930 A | 10/2018 | | |
| JP | 2017173433 A * | 9/2017 | ............... | G10C 3/12 |
| JP | 2018072532 A | 5/2018 | | |
| WO | WO-2018169080 A1 * | 9/2018 | ............... | G10B 3/12 |

OTHER PUBLICATIONS

Office Action issued in Chinese Appln. No. 202110289415.5, dated Sep. 26, 2023. English translation provided.

* cited by examiner

*Primary Examiner* — Jianchun Qin
(74) *Attorney, Agent, or Firm* — ROSSI, KIMMS & McDOWELL LLP

(57) ABSTRACT

A key support structure of a keyboard device includes a first member and a second member that supports the first member. The first member is pivotal about a first axis that extends in a first direction and movable with a degree of freedom of movement in a rolling direction, which is a direction of rotation around a second axis extending in a second direction that is substantially orthogonal to the first direction. the second member restricts a movement of the first member in the first direction, while pivotally supporting the first member about the first axis.

22 Claims, 20 Drawing Sheets

KEY SUPPORT STRUCTURE OF KEYBOARD DEVICE

CROSS REFERENCE TO RELATED APPLICATIONS

This application is based on and claims the benefit of priority from the prior Japanese Patent Application No. 2020-050877, filed on Mar. 23, 2020, the entire contents of which are incorporated herein by reference.

FIELD

The present disclosure relates to a key support structure of a keyboard device.

BACKGROUND

Conventionally, a structure for rotatably supporting a key of a keyboard device such as an electronic musical instrument are known. The conventional keyboard device rotatably supports the key by a rod-shaped flexible member between a frame and the key. The flexible member can absorb key deformation due to aging or the like by curving or twisting. Thus, the conventional keyboard device utilizes flexibility of the flexible member to improve an appearance of the keyboard device.

SUMMARY

A key support structure of a keyboard device according to an embodiment of the present disclosure includes a first member and a second member that supports the first member. The first member is pivotal about a first axis that extends in a first direction and movable with a degree of freedom of movement in a rolling direction, which is a direction of rotation around a second axis extending in a second direction that is substantially orthogonal to the first direction. the second member restricts a movement of the first member in the first direction, while pivotally supporting the first member about the first axis.

A key support structure of the keyboard device according to an embodiment of the present disclosure includes a first member, a second member contacting the first member at a first contact point and a second contact point, and a third member contacting the first member at a third contact point. At least one member, among the first member, the second member, and the third member, is slideable at one contact, among the first contact, second contact, and third contact. In a state where a first normal vector at the first contact point, a second normal vector at the second contact point, and the third normal vector intersect at a common point, an angle between a pair of neighboring normal vectors, among the first, second, and third vectors, is less than 180 degrees.

A key support structure of the keyboard device according to an embodiment of the present disclosure includes a first member, a second member contacting the first member at a first contact point and a second contact point, and a third member contacting the third member at a third contact point. the second member and the third member support the first member at the first contact point, the second contact point, and the third contact point.

According to an embodiment of the present disclosure, a simple key support structure may improve the appearance of the keyboard device.

DESCRIPTION OF THE EMBODIMENTS

Figure 1:
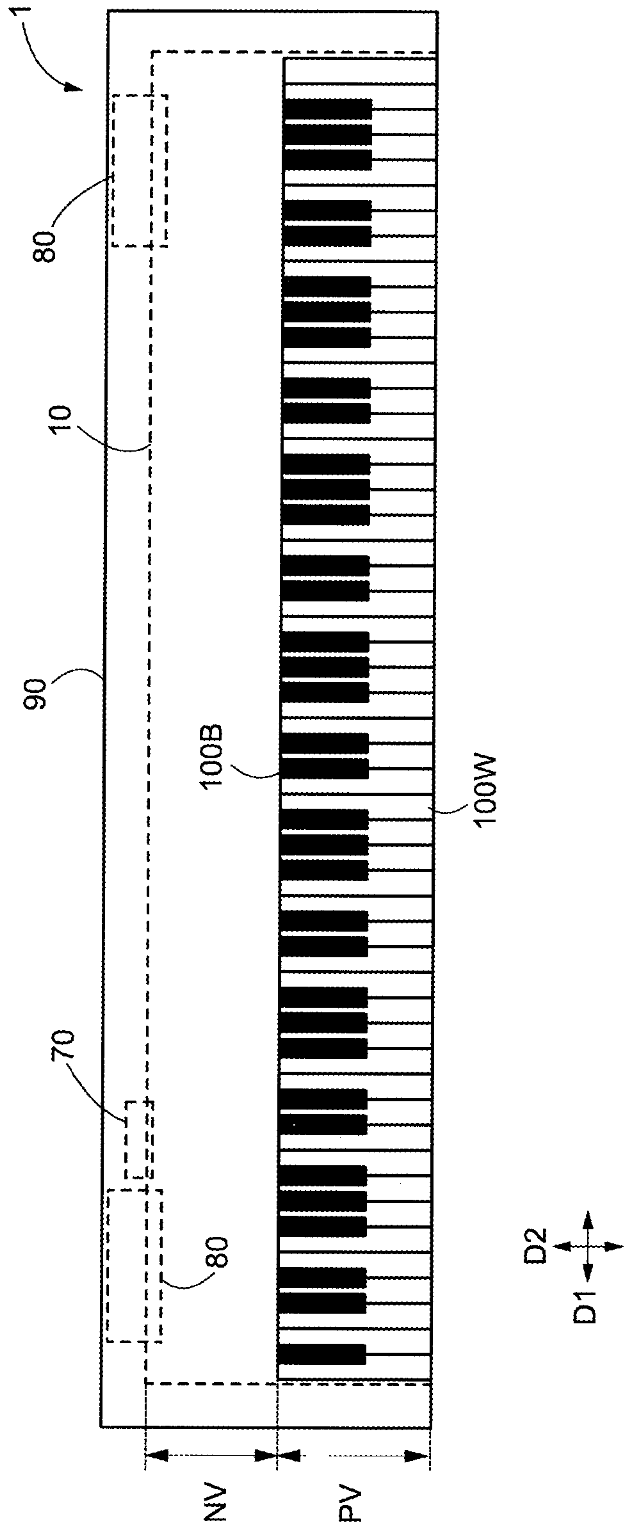
FIG. 1 is a plan view showing a configuration of a keyboard device.

The above-mentioned keyboard device requires the same number of the flexible member as the number of keys. In addition, there is a need for a structure for mounting the flexible member on both the frame side and the key side. Therefore, it is desired to realize a keyboard device using a simpler support structure.

One of the objects of the present disclosure is to improve the appearance of the keyboard device by a support structure of a simple key.

Hereinafter, embodiments of the present disclosure will be described in detail referring to the drawings. The following embodiments are examples of embodiments of the present disclosure, and the present disclosure is not to be construed as being limited to these embodiments. In the drawings referred to in the present embodiment, portions having the same or similar functions are denoted by the same or similar reference numerals, and a description thereof may be omitted. For convenience of description, the dimensional ratio in the drawings may be different from the actual ratio, or a part of the configuration may be omitted from the drawings.

In the present specification, for the keyboard device, the expressions indicating directions such as up, down, left, right, front, and back are based on a player when playing. For convenience of explanation, the direction may be indicated based on the key, but in this case, a front-end side (front side) and a rear-end side (rear side) of the key correspond to a front side and a rear side, respectively, based on the player.

The term "arc" herein includes not only the arc in a strict sense, but also shapes (approximately arc) that can be regarded as approximately arc. For example, even if an external form of the member is not a perfect arc due to the effects of manufacturing errors, etc., the external form of the member can be regarded as an arc if it has a function equivalent to the member whose external form is an arc. Similarly, the terms "coincident" or "identical" include cases that differ slightly (i.e., approximately coincident, or approximately identical) so as not to impair the function.

[Configuration of Keyboard Device]

FIG. 1 is a plan view showing a configuration of a keyboard device 1. In this embodiment, the keyboard device 1 is an electronic keyboard device that sounds in response to a key depression by a user (player) such as an electronic piano. The keyboard device 1 may be a keyboard-type controller that outputs control data (e.g., MIDI) for controlling an external sound source device in response to a key depression. In this instance, the keyboard device 1 may not have the sound source device.

The keyboard device 1 includes a keyboard assembly 10. The keyboard assembly 10 includes a white key 100W and a black key 100B. A plurality of white keys 100W and a plurality of black keys 100B are arranged side by side. The number of the key 100 is N, in this example 88. The direction in which the keys are arranged is referred to as a scale direction. In FIG. 1, a first direction (D1) is a scale direction. A second direction (D2) orthogonal to the first direction is a longitudinal direction of the key 100. With the player as a reference, the first direction is the lateral direction, and the second direction is the anterior-posterior direction.

If the white key 100W and the black key 100B can be described without particular distinction, it may be referred to as the key 100. Also, in the following description, when "W" is attached to the end of the code, it means that the configuration corresponds to the white key. When "B" is attached to the end of the code, this means that the configuration corresponds to the black key.

A part of the keyboard assembly 10 exists within a housing 90. When the keyboard device 1 is viewed from above, a portion of the keyboard assembly 10 covered by the housing 90 is referred to as a non-appearance portion NV. A portion exposed from the housing 90 and visible to the user (a portion located closer to the front side than the non-appearance portion NV) is referred to as an appearance portion PV. That is, the appearance portion PV is a part of the key 100 and indicates a region that can be played by the user. Hereinafter, a portion of the key 100 exposed by the appearance portion PV may be referred to as a key body portion.

Inside the housing 90, a sound source device 70 and a speaker 80 are disposed. The sound source device 70 generates a sound waveform signal with the depression of the key 100. The speaker 80 outputs the sound waveform signal generated in the sound source device 70 to an external space. The keyboard device 1 may include a slider for controlling the volume, a switch for switching the timbre, a display for displaying various data, and the like.

Figure 2:
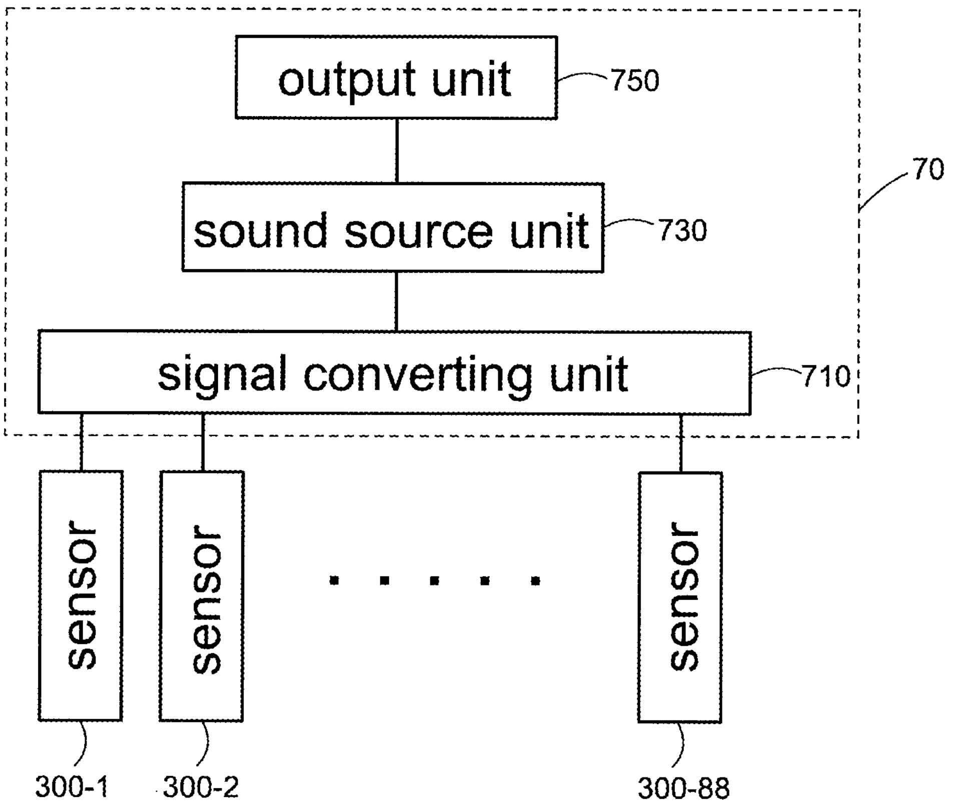
FIG. 2 is a block diagram showing a configuration of a sound source device.

FIG. 2 is a block diagram showing a configuration of the sound source device. The sound source device 70 includes a signal converting unit 710, a sound source unit 730 and an output unit 750. A sensor 300 is provided corresponding to each key 100. The sensor 300 detects an operation of the key and outputs a signal corresponding to the detected content. In this example, the sensor 300 outputs a signal in accordance with the key depressing amount of three stages. Key depression rate can be detected in response to intervals of these signals.

The signal converting unit 710 acquires an output signal of the sensor 300 (the sensors 300-1, 300-2, . . . , 300-88 corresponding to the 88 keys 100) and generates and outputs an operation signal corresponding to the operation state in each key 100. In this instance, the operating signal is a signal in the form of MIDI. Therefore, in response to the key depression operation, the signal converting unit 710 outputs note on. At this time, the key number indicating which of the 88 keys 100 has been operated and the velocity corresponding to the key depression rate are also output in association with note on. On the other hand, in response to a key release operation, the signal converting unit 710 outputs the key number and note off in association with each other. A signal corresponding to other operations such as a pedal is input to the signal converting unit 710 and may be reflected in the operation signal.

The sound source unit 730 generates the sound waveform signal based on the operation signal output from the signal converting unit 710. The output unit 750 outputs the sound waveform signal generated by the sound source unit 730. The sound waveform signal is output to, for example, the speaker 80 or an output terminal for outputting the sound waveform signal.

[Configuration of Keyboard Assembly]

Figure 3:
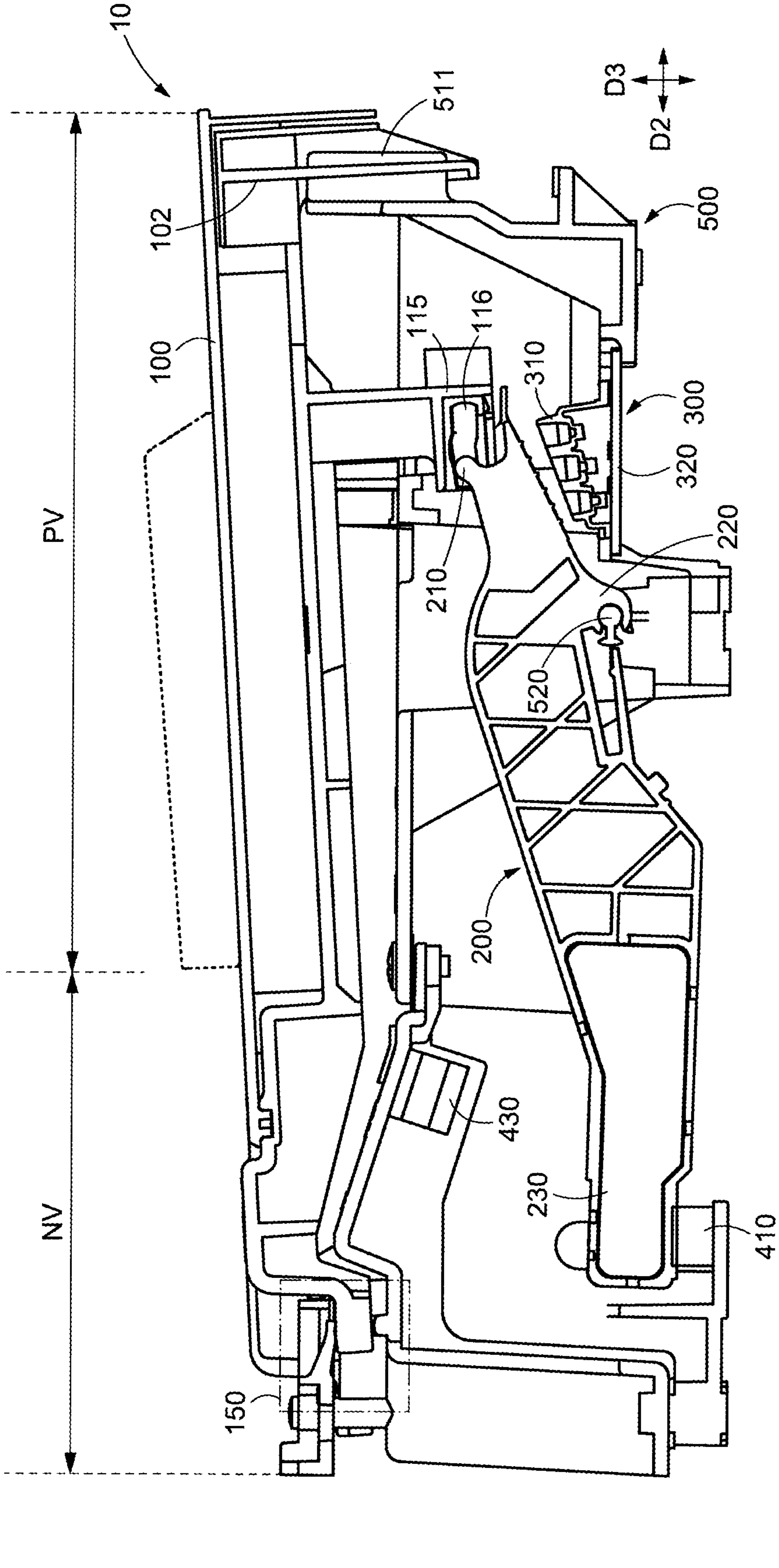
FIG. 3 is a side view showing a configuration of a keyboard assembly.

FIG. 3 is a side view showing a configuration of the keyboard assembly 10. The keyboard assembly 10 includes the key 100, a supporting portion 150, a hammer assembly 200, the sensor 300 and a frame 500. The keyboard assembly 10 is a resin-made structure manufactured by injection molding or the like in most configurations. In FIG. 3, a third direction (D3) is a direction orthogonal to the first direction (D1) and the second direction (D2). The third direction is the vertical direction based on the player. The third direction may also be referred to as a key depression direction or a stroke direction.

The frame 500 is fixed to a housing (not shown). A plurality of keys 100 are rotatably supported on the frame 500, thereby forming the keyboard assembly 10. The key 100 rotates about a pivot point around an axis extending in a first direction. The supporting portion 150 rotatably supports the key 100 relative to the frame 500. The supporting portion 150 is composed of an axis portion 110 and a bearing portion 120 shown in FIG. 10 to be described later. Specific structures of the supporting portion 150 will be described later.

The key 100 includes a front-end key guide 102. The front-end key guide 102 is provided on a tip of the white key 100W. The front-end key guide 102 is a plate-shaped member having a surface facing forward (player side). A vertically elongated slit (not shown) is provided in the approximately center of the surface of the front-end key guide 102. The frame 500 includes a front-end frame guide 511. The front-end frame guide 511 is a plate-shaped member protruding forward. When the white key 100W is mounted on the frame 500, the front-end frame guide 511 is slidably inserted into the slit of the front-end key guide 102. At the time of the key depression operation, the white key 100W moves in the vertical direction while sliding the inside of the slit of the front-end key guide 102 to the front-end frame guide 511. This movement limits the movement of the key 100 in the scale direction, yawing direction, and rolling direction at the front-end, as will be described below.

In the example shown in FIG. 3, an example in which a guide structure composed of the front-end key guide 102 and the front-end frame guide 511 is provided at the front-end of the white key 100W is shown, but the present invention is not limited to this example. Such a guide structure may be provided in a portion of the white key 100W within a range of half from the front (front-end) (preferably, a portion in which the width of the white key 100W is wider than other portions). Further, an example in which a plate-shaped member is used as the front-end frame guide 511 is shown, but it is not limited to this example, it may be a structure in contact with the inside of the slit of the front-end key guide 102 at two portions in the vertical direction. In this case, the slit of the front-end key guide 102 may be constituted by two slits arranged in the vertical direction. That is, the above-mentioned two portions in the vertical direction may be in contact with the insides of the two slits, respectively. Further, although an example in which the front-end key guide 102 is a slit is shown, the present invention is not limited to this example. That is, the shape of the front-end key guide 102 is arbitrary as long as the front-end key guide 102 contacts the front-end frame guide 511 at two points in the vertical direction.

The hammer assembly 200 is disposed in a space below the key 100 and is rotatably attached to the frame 500. A shaft supporting portion 220 of the hammer assembly 200 and a rotational axis 520 of the frame 500 are slidably in contact with each other at least at three points. A front-end portion 210 of the hammer assembly 200 is in contact with the hammer assembly so that it slides approximately anterior-posterior direction in an interior space 116 of the hammer supporting portion 115. This sliding portion (i.e., the portion where the front-end portion 210 and the hammer supporting portion 115 contacts) is located below the key 100 in the appearance portion PV.

In the hammer assembly 200, at the rear side of the rotational axis 520, a metallic weight portion 230 is disposed. Normally (when the key is not depressed), the weight portion 230 is in contact with a lower stopper 410. In this state, the front-end portion 210 of the hammer assembly 200 is pushing the key 100 upward. When the key is depressed, the key 100 depresses the front-end portion 210 of the hammer assembly 200 downward. As a result, the weight portion 230 is moved upward and in contact with an upper stopper 430. The hammer assembly 200 provides a weight on the key depression operation by the weight portion 230. The lower stopper 410 and the upper stopper 430 are made of a cushioning material or the like, such as a nonwoven fabric or an elastic body.

The sensor 300 is mounted on the frame 500 below the hammer supporting portion 115 and the front-end portion 210 of the hammer assembly 200. The sensor 300 is composed of an upper electrode portion 310 having a structure in which an electrode is attached to a flexible member, and a lower electrode portion 320 having a structure in which an electrode is provided in a circuit substrate. When the upper electrode portion 310 of the sensor 300 is crushed on the lower surface side of the front-end portion 210 of the hammer assembly 200 by the key depression, the electrode of the upper electrode portion 310 and the electrode of the lower electrode portion 320 contact in the order from the rear side (the side closer to the rotational axis 520 of the hammer assembly 200). By this contacting, the sensor 300 outputs a detection signal according to the key depressing amount of three stages. As described above, the sensor 300 is provided corresponding to each key 100.

Figure 4:
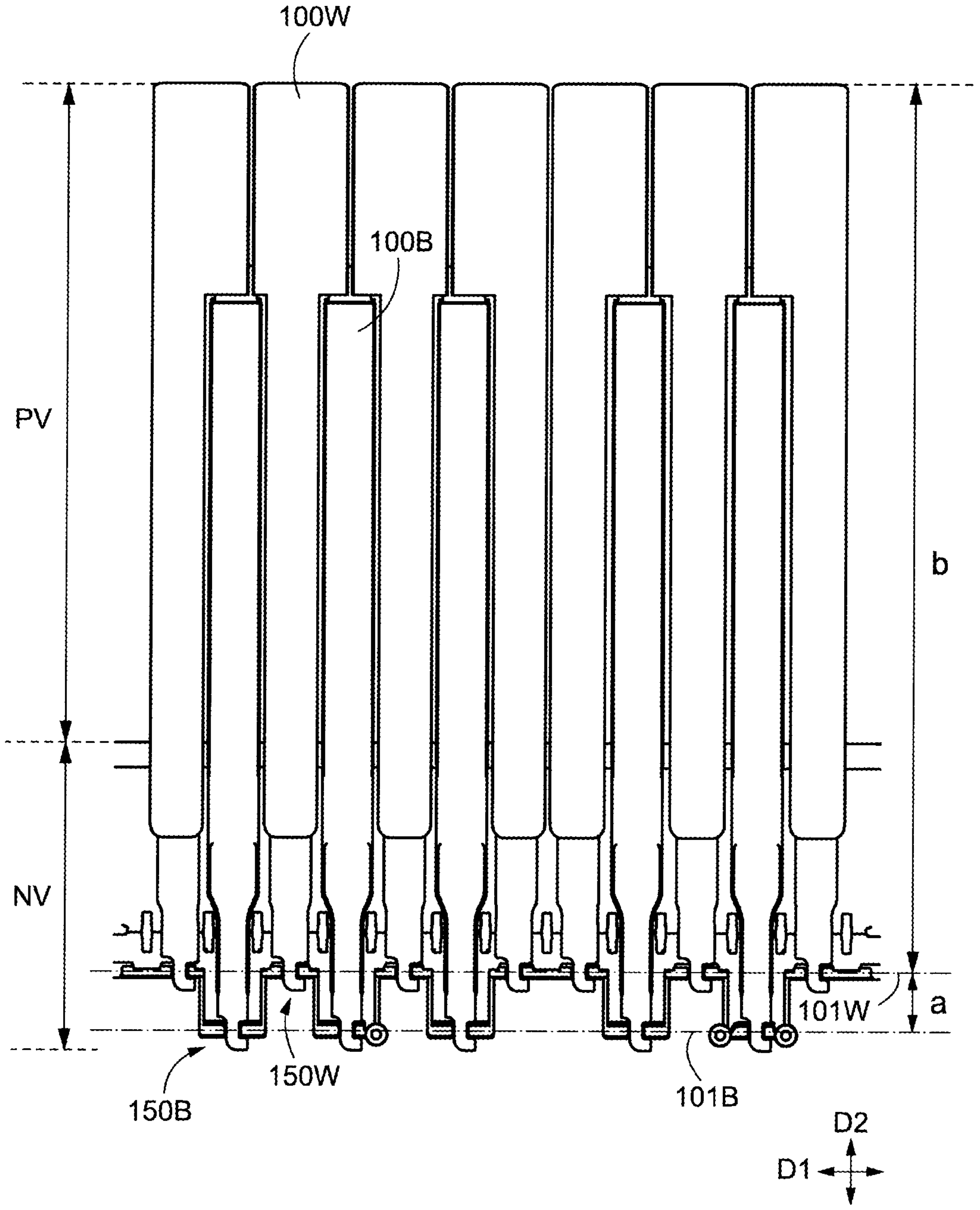
FIG. 4 is a plan view showing a configuration of a keyboard assembly.

FIG. 4 is a plan view showing a configuration of the keyboard assembly 10. In FIG. 4, a part of a configuration of the frame 500 is omitted for convenience of explanation. As shown in FIG. 4, a supporting portion 150B of the black key 100B is arranged on the rear side of a supporting portion 150W of the white key 100W. This position relates to the position of the pivot point (center of rotation) of the key 100. The arrangement shown in FIG. 4 reproduces the difference in the fulcrum between the white key and the black key of the acoustic piano.

Further, in the present embodiment, the positions of the white key 100W and the black key 100B are adjusted so that the touch feeling of the ground piano can be reproduced. More specifically, as shown in FIG. 4, when a distance between a rotational axis 101W of the white key 100W and a rotational axis 101B of the black key 100B is a and a length of the white key 100W (a distance from the rotational axis 101W to the front-end of the white key 100W) is b, the value of a/b is adjusted so as to fall within a range of 0.061 or more and 0.075 or less. The value of a/b in a typical ground piano is about 0.068. In the present embodiment, the touch feeling of the ground piano is reproduced by setting the value of a/b in the keyboard assembly 10 to ±10% of the value of a/b in the keyboard assembly of the ground piano. For example, when the length (b) of the white key 100W is 210 mm or more and 250 mm or less, the distance (a) between the rotational axis 101W of the white key 100W and the rotational axis 101B of the black key 100B may be 14 mm or more and 17 mm or less.

Figure 5:
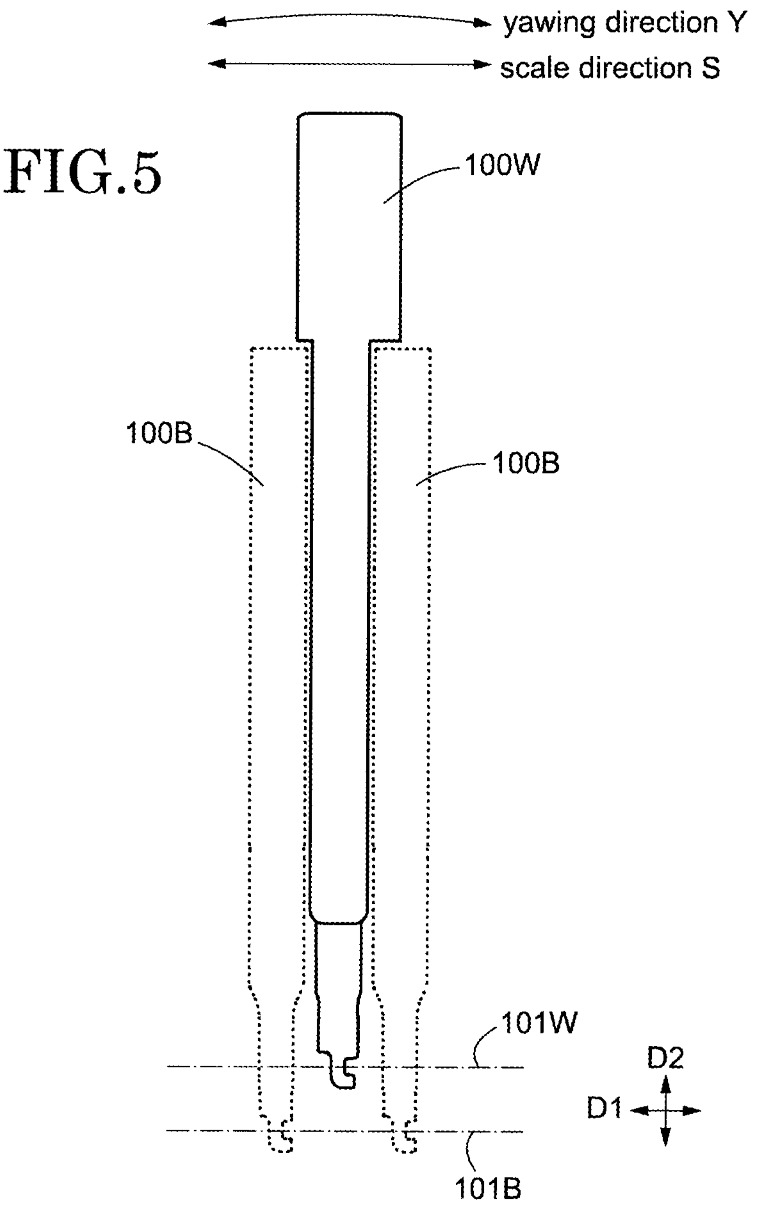
FIG. 5 is a diagram for explaining the definition of a direction of key movement.
Figure 6:
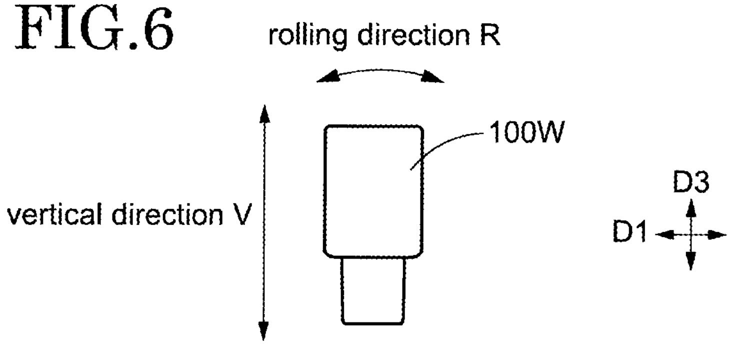
FIG. 6 is a diagram for explaining the definition of a direction of key movement.

FIGS. 5 and 6 are diagrams for explaining a definition regarding the direction of movement of the key 100. Although the white key 100W is exemplified in FIGS. 5 and 6, the same definition is used for the black key 100B.

In FIG. 5, the scale direction S is, as described above, the direction in which the white key 100W and the black key 100B are arranged (the lateral direction as viewed from the player). In the present embodiment, the first direction corresponds to the scale direction S. The yawing direction Y is a direction in which the white key 100W rotates about the third direction (D3) shown in FIG. 3 when the white key 100W is viewed from above. For example, in FIG. 5, when it is assumed that only the rear-end (the supporting portion 150W shown in FIG. 4) of the white key 100W is fixed, the direction in which the white key 100W curves left and right is the yawing direction Y.

In FIG. 6, the rolling direction R is a direction in which the white key 100W rotates about the longitudinal direction of the white key 100W. In other words, the rolling direction R can be said to be the direction of rotation around the axis extending in the second direction (D2) shown in FIG. 5. The vertical direction V is a direction in which the white key 100W is depressed (also referred to as the stroke direction). In the present embodiment, the third direction (D3) corresponds to the vertical direction V.

As described in the prior art, the key may be deformed due to aging or the like. The deformation may be, for example, a curve in the yawing direction Y or a twist in the rolling direction R. If such a deformation appears in the key in the appearance portion PV, the appearance of the keyboard device is impaired. Therefore, it is necessary to have a structure that restricts the deformation of the key so that the deformation of the key is not visually recognized in the appearance portion PV.

In the keyboard assembly 10 of the present embodiment, the key 100 is relatively short, and a large part of the entire key appears in the appearance portion PV. Therefore, the keyboard assembly 10 of the present embodiment is configured to restrict the deformation of the key 100 at the front-end portion and the rear-end portion of the key 100. Specifically, the front-end portion of the key 100, the movement of the scale direction S, the yawing direction Y, and the rolling direction R is restricted by the front-end key guide 102 and the front-end frame guide 511. The rear-end portion of the key 100 is restricted from moving in the scale direction S by the supporting portion 150.

In the present embodiment, the front-end portion of the key 100 restricts the movement in the scale direction S, the yawing direction Y, and the rolling direction R, while providing the degree of freedom of movement in the yawing direction Y and the rolling direction R in the rear-end portion. That is, in the key 100 of the present embodiment, the movement in the scale direction S is restricted and the movement in the yawing direction Y and the rolling direction R is allowed in the supporting portion 150.

[Configuration of Supporting Portion]

Figure 7:
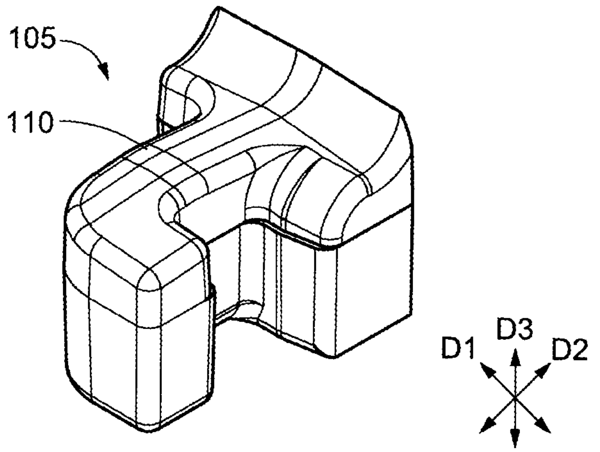
FIG. 7 is a perspective view showing a configuration of a key rear-end portion.
Figure 8:
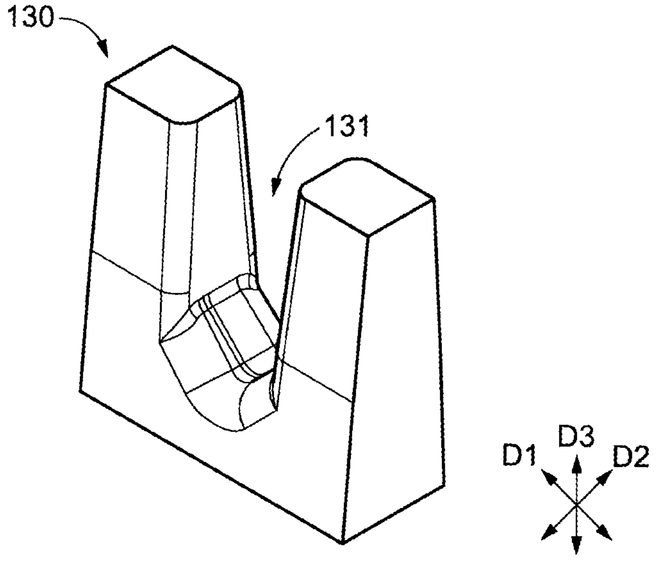
FIG. 8 is a perspective view showing a configuration of a first bearing member.
Figure 9:
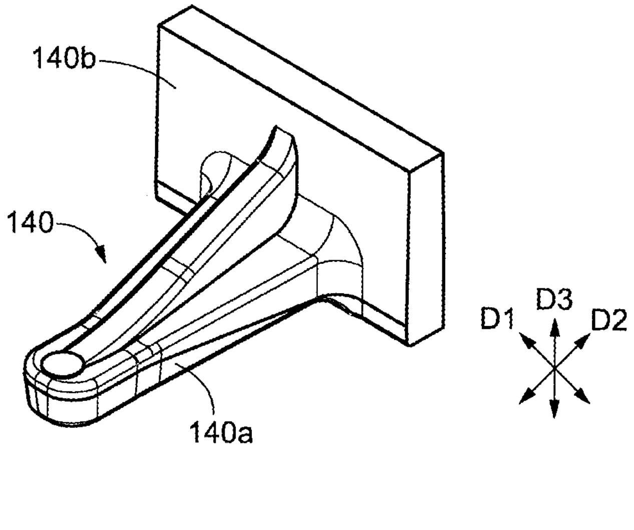
FIG. 9 is a perspective view showing a configuration of a second bearing member.

FIG. 7 is a perspective view showing a configuration of a key rear-end portion 105. FIG. 8 is a perspective view showing a configuration of a first bearing member 130. FIG. 9 is a perspective view showing a configuration of a second bearing member 140.

As shown in FIG. 7, the key rear-end portion 105 has a hook-shaped configuration as a whole. A portion of the key rear-end portion 105 that extends in the second direction is the axis portion 110. The key 100 rotates by rotating the axis portion 110 around the axis extending in the first direction. In FIG. 8, the first bearing member 130 has a groove portion 131. The groove portion 131 functions to support the axis portion 110 as a bearing. The second bearing member 140 shown in FIG. 9 functions to press the axis portion 110 in the third direction when the axis portion 110 is disposed inside the groove portion 131 of the first bearing member 130. As will be described later, the second bearing member 140 is elastic in the third direction. Therefore, the axis portion 110 can move in the third direction within a certain range if a force greater than the elastic force received from the second bearing member 140 is applied.

Figure 10:
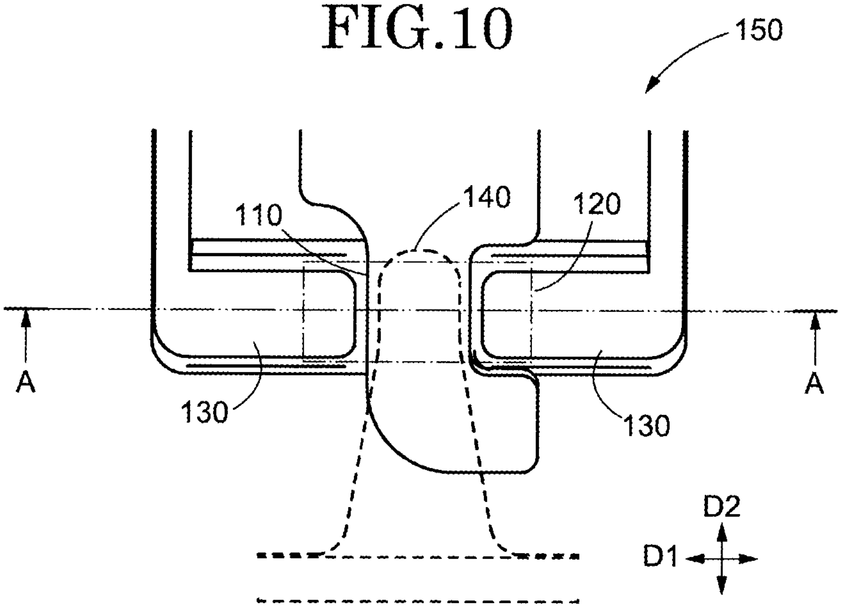
FIG. 10 is a plan view showing a configuration of a supporting portion.
Figure 11:
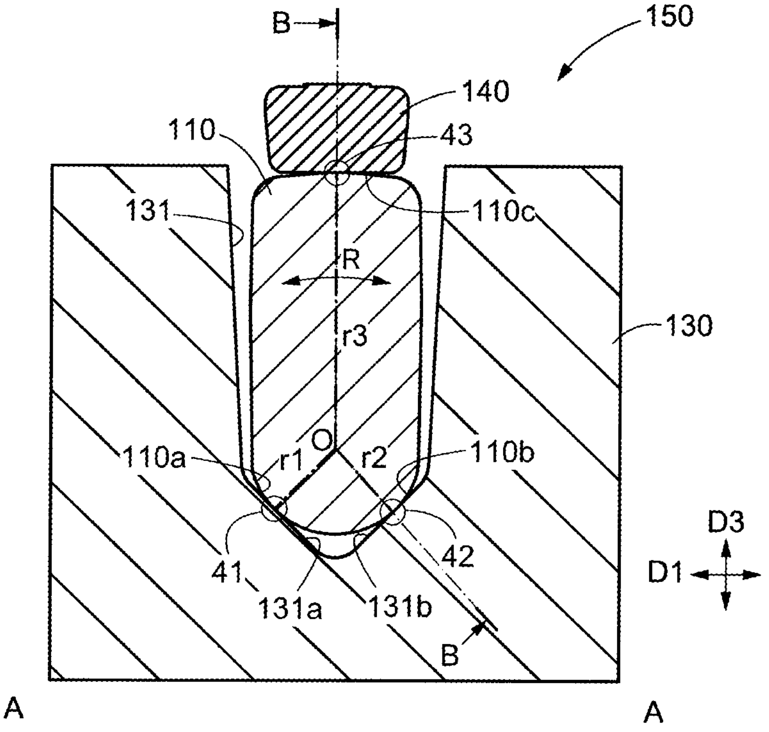
FIG. 11 is a cross-sectional view showing a configuration of a supporting portion.

FIG. 10 is a plan view showing a configuration of the supporting portion 150. Specifically, it corresponds to a plan view obtained by enlarging the supporting portion 150B of the black key 100B shown in FIG. 4. FIG. 11 is a cross-sectional view showing a configuration of the supporting portion 150. Specifically, FIG. 11 corresponds to a cross-sectional view in which the supporting portion 150 shown in FIG. 10 is cut along A-A line. In FIGS. 10 and 11, the supporting portion 150B of the black key 100B is exemplified, but the supporting portion 150W of the white key 100W has a similar structure.

As shown in FIG. 10, the supporting portion 150 includes the axis portion 110 and the bearing portion 120. The bearing portion 120 is composed of the first bearing member 130 and the second bearing member 140. The axis portion 110 is rotatably supported by the bearing portion 120 around the axis extending in the first direction. That is, the key 100 rotates with the axis extending in the first direction as the rotational axis. The pivot point when the key 100 rotates is at the rotational axis in the plane where the axis portion 110 is cut along the second direction.

The axis portion 110 is located in the key rear-end portion 105 of the key 100. The axis portion 110 is a rod-shaped portion extending in the second direction. As shown in FIG. 11, in the present embodiment, the cross section of the axis portion 110 is approximately elliptical, but the cross section may be polygonal or approximately circular.

The first bearing member 130 is a part of the frame 500. The first bearing member 130 of the present embodiment has the groove portion 131. As shown in FIG. 11, the axis portion 110 is disposed inside the groove portion 131 of the first bearing member 130. The axis portion 110 contacts the groove portion 131 with contact points 41 and 42. In the present embodiment, by the axis portion 110 is in contact with the first bearing member 130 at the contact point 41 and the contact point 42, the movement of the axis portion 110 in the first direction (scale direction S) is restricted.

The second bearing member 140 is a member that sandwiches the axis portion 110 between itself and the first bearing member 130. The second bearing member 140 has a function of pressing the axis portion 110 against the first bearing member 130. Therefore, the movement of the axis portion 110 in the third direction (vertical direction V) is restricted by the second bearing member 140.

In the present embodiment, the second bearing member 140 is coupled to and fixed to the frame 500. Specifically, the second bearing member 140 has a configuration in which a body portion 140*a* shown in FIG. 9 is held by a holding portion 140*b* connected to the frame. That is, the body portion 140*a* is held in a cantilever structure to the holding portion 140*b*. The second bearing member 140 contacts the axis portion 110 at a contact point 43. That is, the axis portion 110 is supported by the bearing portion 120 by the contact point 41, the contact point 42 and the contact point 43.

The second bearing member 140 is elastic. In the present specification, "member A is elastic" means that when the member A and the member B have a contact point, the member A has a property that it can deform while holding the contact point in response to a change in the force applied from the member B. In other words, the contact point described above is movable between the member A and the member B along the directions in which the elastic force of the member A acts. Therefore, in the structure shown in FIG. 11, even if the axis portion 110 moves in the third direction, the contact point 43 is held in accordance with the movement of the second bearing member 140 in the third direction. Thus, the movement of the axis portion 110 in the third direction is allowed within a certain range, although restricted by the elastic force of the second bearing member 140.

The axis portion 110 has a curved surface 110*a*, a curved surface 110*b*, and a curved surface 110*c*. The curved surface 110*a* is in contact with a curved surface 131*a* of the first bearing member 130 at the contact point 41. The curved surface 110*b* is in contact with a curved surface 131*b* of the first bearing member 130 at the contact point 42. The curved surface 110*c* is in contact with the second bearing member 140 at the contact point 43. At this time, as shown in FIG. 11, the external form of the axis portion 110 is arc shape at the contact point 41, the contact point 42 and the contact point 43. That is, the contact point 41, the contact point 42 and the contact point 43 are points on arcs which are the external form of the axis portion 110.

In the example shown in FIG. 11, when the radius of an arc having the contact point 41 is r1 and the radius of an arc having the contact point 42 is r2, the radius r1 and the radius r2 are equal. That is, a lower end of the axis portion 110 is semicircular shape. The radius of an arc having the contact point 43 is r3. The radius r3 is greater than the radius r1 and the radius r2. That is, the axis portion 110 is a member having a longitudinal direction in the third direction in a cross-sectional view.

In FIG. 11, the arc having the contact point 41, the arc having the contact point 42, and the arc having the contact point 43 are arcs having the same center O. Therefore, the axis portion 110 is rotatable with the center O as the pivot point. That is, the key 100 is rotatable in the rolling direction R that is the direction of rotation around the axis extending in the second direction. In other words, the key 100 has a degree of freedom of movement in the rolling direction R. Thus, in the supporting portion 150 of the present embodiment, at the contact point 41, the contact point 42 and the contact point 43, the axis portion 110 rotates while intermittently sliding to the bearing portion 120.

Figure 12:
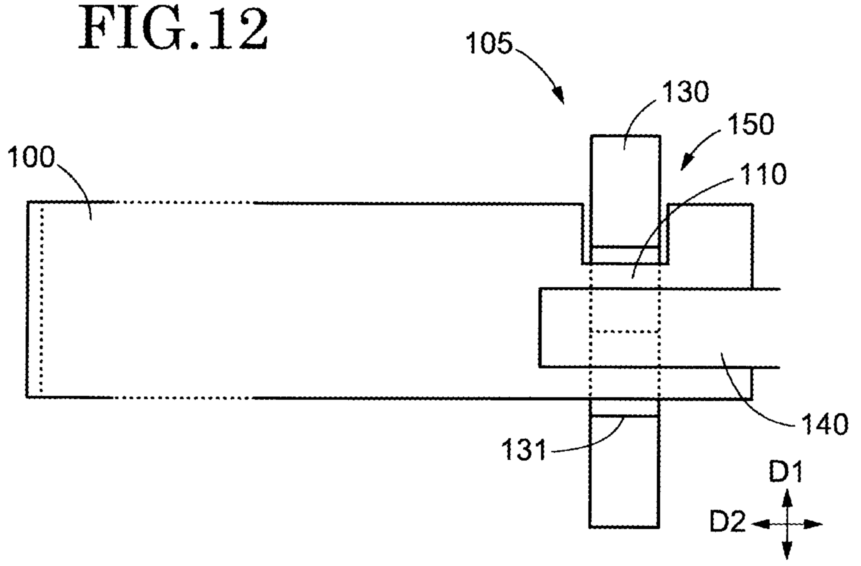
FIG. 12 is a plan view schematically illustrating a configuration of a key.
Figure 13:
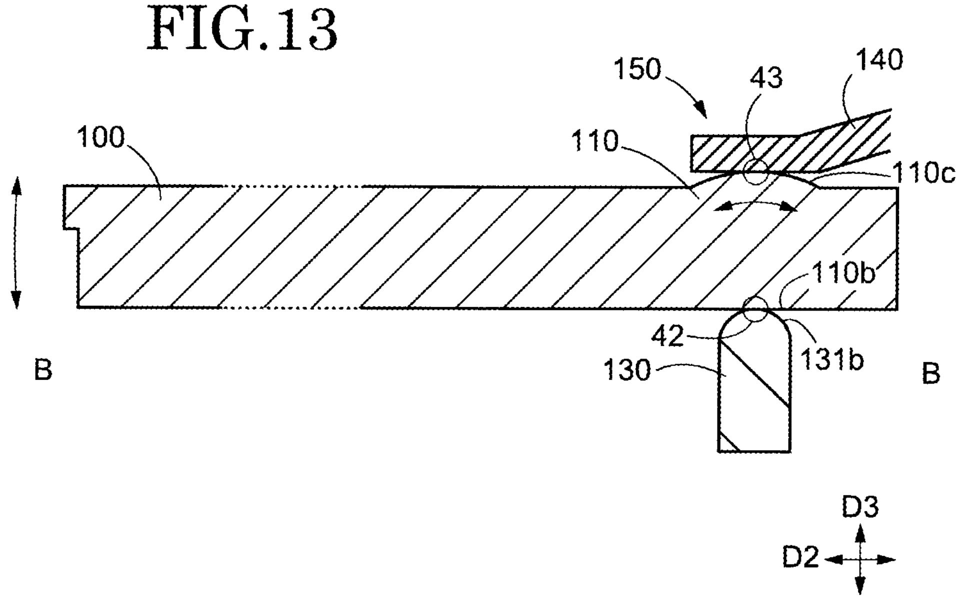
FIG. 13 is a cross-sectional view schematically illustrating a configuration of a key.

FIG. 12 is a plan view schematically illustrating a configuration of the key 100. FIG. 13 is a cross-sectional view schematically illustrating a configuration of the key 100. Specifically, FIG. 13 corresponds to a cross-sectional view in which the key 100 is cut by the B-B line through the contact point 42, the center O and the contact point 43 according to the cross-sectional view shown in FIG. 11. As shown in FIG. 12, the supporting portion 150 is disposed on the key rear-end portion 105 of the key 100. However, the present invention is not limited to this embodiment, and the supporting portion 150 may be disposed at a position other than the key rear-end portion 105 of the key 100.

As shown in FIG. 13, in a cross-sectional view in a plane orthogonal to the first direction (D2-D3 plane), the cross-sectional shape of the curved surface 110*b* of the axis portion 110 is linear. However, not limited to this example, the cross-sectional shape of the curved surface 110*b* may be curved. On the other hand, the cross-sectional shape of the curved surface 110*c* is curved. In this case, it is preferable that the cross-sectional shape of the curved surface 110*c* is an arc whose radius is the length between the contact point 42 and the contact point 43. Further, an inner wall of the groove portion 131 of the first bearing member 130 has the curved surface 131*b*. Therefore, at the contact point 42, the curved surface of the axis portion 110 and the curved surface 131*b* in the groove portion 131 of the curved surface 110*b* are in contact with each other. Although not shown in FIG. 13, similarly to the contact point 42, at the contact point 41, the curved surface 110*a* of the axis portion 110 and the curved surface 131*a* of the groove portion 131 are in contact with each other.

With the configuration shown in FIG. 13, during the key depression operation, the key 100 rotates around the rotational axis 101 which through the contact point 41 and the contact point 42. In FIG. 13, the contact point 42 is the center of rotation. At this time, since the axis portion 110 has the curved surface 110*c* at the contact point 43 where the axis portion 110 and the second bearing member 140 are in contact with each other, the supporting portion 150 does not hinder the rotation when the key 100 rotates.

Figure 14:
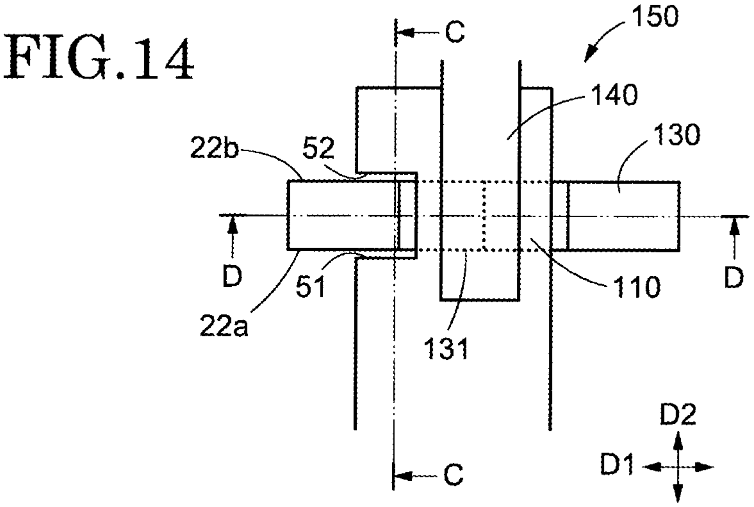
FIG. 14 is a plan view schematically illustrating a configuration of a supporting portion.
Figure 15:
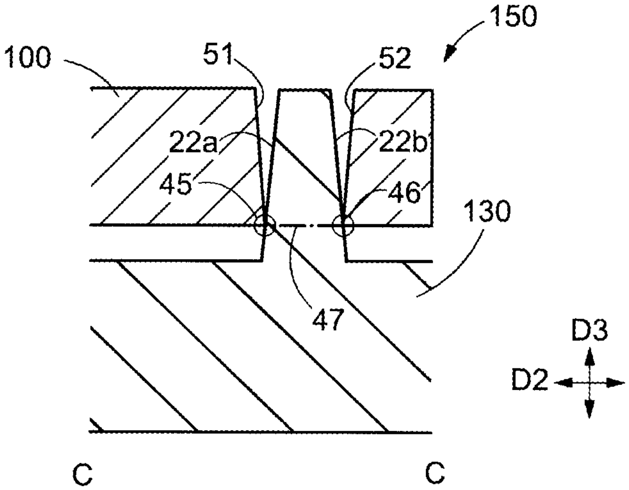
FIG. 15 is a cross-sectional view schematically illustrating a configuration of a supporting portion.
Figure 16:
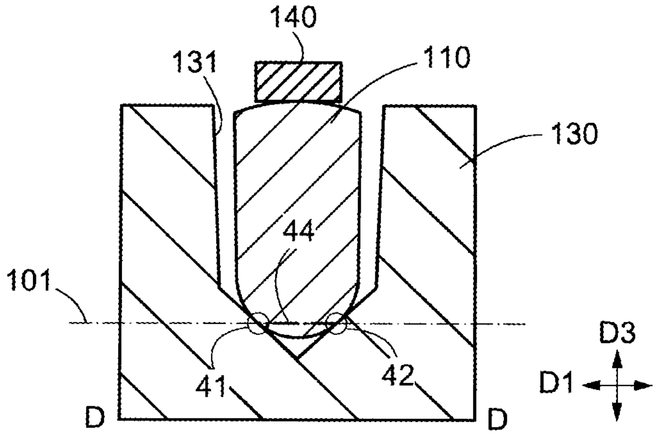
FIG. 16 is a cross-sectional view schematically illustrating a configuration of a supporting portion.

FIG. 14 is a plan view schematically showing a configuration of the supporting portion 150. FIGS. 15 and 16 are cross-sectional views schematically showing a configuration of the supporting portion 150. Specifically, FIG. 15 corresponds to a cross-sectional view in which the supporting portion 150 shown in FIG. 14 is cut along C-C line. FIG. 16 corresponds to a cross-sectional view in which the supporting portion 150 shown in FIG. 14 is cut along D-D line.

As shown in FIG. 14, the supporting portion 150 has a first positioning portion 51 and a second positioning portion 52 for determining the position of anterior-posterior direction (the second direction) of the axis portion 110. The first positioning portion 51 and the second positioning portion 52, respectively, portions facing the first bearing member 130. The first positioning portion 51 faces a front inclined portion 22*a* of the first bearing member 130. The second positioning portion 52 faces a rear inclined portion 22*b* of the first bearing member 130. That is, the first positioning portion 51 and the second positioning portion 52 are disposed so as to face each other across the first bearing member 130. Here, in FIG. 14, the aforementioned D-D line matches the rotational axis of the axis portion 110 in the key depression operation. That is, the first positioning portion 51 and the second positioning portion 52 sandwiches the rotational axis of the axis portion 110, in a position isolated from the rotational axis to each other.

As shown in FIG. 15, in a cross-sectional view, the first bearing member 130 in the third direction has a shape (trapezoidal shape) in which the tip tapers toward the tip (upward). In contrast, the first positioning portion 51 and the second positioning portion 52 are inclined on the opposite side to the front inclined portion 22*a* and the rear inclined portion 22*b*, respectively. That is, in a cross-sectional view, the space between the first positioning portion 51 and the second positioning portion 52, on the contrary to the first bearing member 130, in the third direction, has a shape (trapezoidal shape) in which the tip tapers toward the lower.

In the present embodiment, by disposing the axis portion 110 in the groove portion 131 of the first bearing member 130, the lower ends of the first positioning portion 51 and the second positioning portion 52 are in contact with the first bearing member 130 at a contact point 45 and a contact point 46. Therefore, when the axis portion 110 is supported by the bearing portion 120, the movement of the axis portion 110 to the anterior-posterior direction (the second direction) is restricted. The lower ends of the first positioning portion 51 and the second positioning portion 52 are preferably curved to improve the durability.

At this time, it is desirable that the position in the third direction of a line segment 44 connecting the contact point 41 and the contact point 42 in FIG. 16, and the position in the third direction of a line segment 47 connecting the contact point 45 and the contact point 46 in FIG. 15 are approximately coincident or as close as possible. By bringing close the line segment 44 and the line segment 47 in the third direction, at the time of key depression operation, it is possible to suppress the change in the gap (clearance) between the first bearing member 130 and the first positioning portion 51, and between the first bearing member 130 and the second positioning portion 52.

Figure 17:
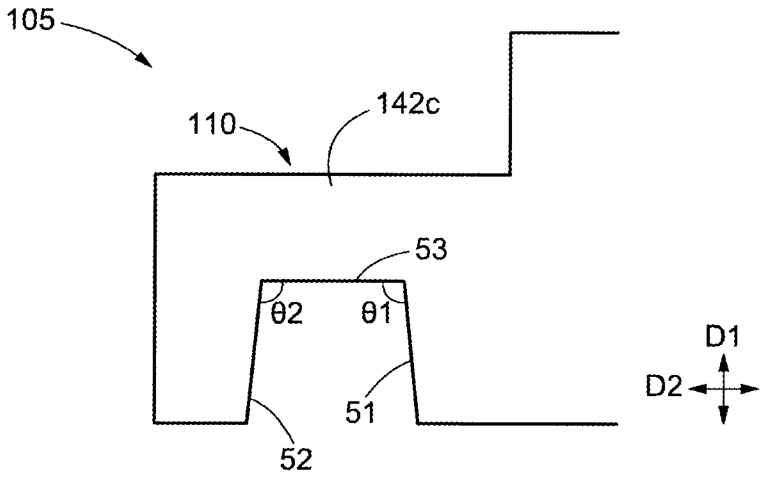
FIG. 17 is a plan view schematically showing a configuration of a key rear-end portion.

FIG. 17 is a plan view schematically showing a configuration of the key rear-end portion 105. As shown in FIG. 17, the first positioning portion 51 of the present embodiment has an angle θ1 larger than 90° between a side 53 substantially parallel to the second direction. That is, the first positioning portion 51 is inclined to the first direction. Similarly, the second positioning portion 52 has an angle θ2 larger than 90° between the side 53 and is inclined to the first direction. However, the example shown in FIG. 17 is merely an example, and the angles θ1 and θ2 may be 90 degrees or less. In FIG. 17, an example in which the first positioning portion 51 and the second positioning portion 52 are formed of straight sides is shown, but the present invention is not limited to this example, and curved sides may be used. The axis portion 110 may have a structure in which the first positioning portion 51 and the second positioning portion 52 are in contact with the first bearing member 130 at least one point, respectively. That is, as long as the axis portion 110 and the first bearing member 130 are in contact with each other at two positions in the front and the rear, it is possible to restrict the movement of the axis portion 110 to the anterior-posterior direction (the second direction).

Figure 18:
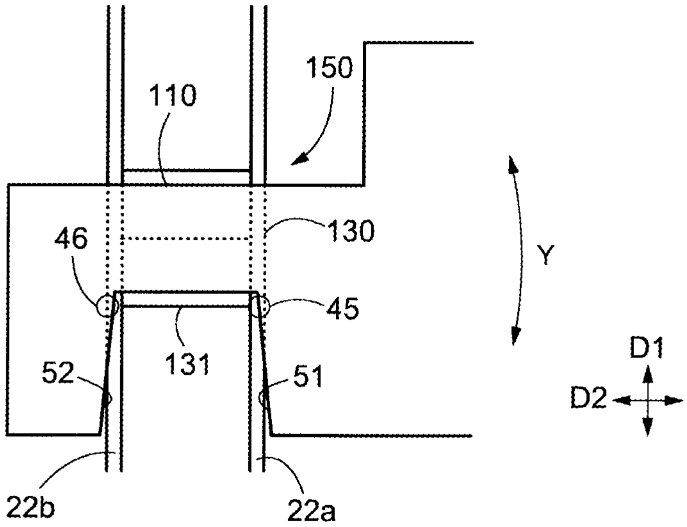
FIG. 18 is a plan view schematically showing a state in which an axis portion is disposed in a first bearing member.

FIG. 18 is a plan view schematically showing a state in which the axis portion 110 is disposed in the first bearing member 130. As described above, the first positioning portion 51 and the second positioning portion 52 are inclined to the first direction. Therefore, gaps are formed between the front inclined portion 22*a* of the first bearing member 130 and the first positioning portion 51, and between the rear inclined portion 22*b* of the first bearing member 130 and the second positioning portion 52 as the distance from the groove portion 131 increases. Therefore, the axis portion 110 is rotatable in the yawing direction Y. That is, the key 100 has a degree of freedom of movement in the yawing direction Y. However, when the axis portion 110 rotates in the yawing direction Y, the positions of the contact points (the contact point 45 and the contact point 46) in which the axis portion 110 and the first bearing member 130 are in contact with each other change.

As described referring to FIGS. 10 and 11, the axis portion 110 is pressed to the first bearing member 130 by the second bearing member 140. Therefore, the axis portion 110 is restricted the movement in the third direction (the direction deviating from the first bearing member 130) by the second bearing member 140. However, if a force greater than the elastic force of the second bearing member 140 is exerted to the axis portion 110, the axis portion 110 can be moved upward within a certain range. As shown in FIGS. 15 and 16, in the supporting portion 150 of the present embodiment, the axis portion 110 is disposed on the groove portion 131 of the first bearing member 130 and is in contact at the contact point 41, the contact point 42, the contact point 45 and the contact point 46. Thus, when the axis portion 110 moves in the yawing direction Y, the axis portion 110 moves upward against the elastic force of the second bearing member 140 with changes in the positions of the respective contact points. That is, in the present embodiment, since the second bearing member 140 is elastic, it is possible to provide a degree of freedom of movement in the yawing direction Y to the axis portion 110.

As described above, the support structure (the supporting portion 150) of the key 100 in the keyboard device 1 of the present embodiment, the axis portion 110, which is a part of the key 100, has a degree of freedom of movement in the rolling direction R and the yawing direction Y. Therefore, according to the support structure of the present embodiment, it is possible to absorb the deformation of the key caused by aging or the like, and to improve the appearance of the keyboard device 1 by a simple support structure. In addition, the key 100 can be supported by a simple structure in which a part of the key 100 (the rear-end portion in this embodiment) is disposed in a part of the frame 500 (the bearing portion 120) instead of a structure in which the key 100 and the frame 500 are connected to each other by a separate member.

(Modification 1)

In the present embodiment, an example in which the first bearing member 130 is constituted by a part of the frame 500 and the second bearing member 140 is coupled to the frame 500 is shown. However, the present invention is not limited to this embodiment, the first bearing member 130 and the second bearing member 140 may be integrated. That is, the first bearing member 130 and the second bearing member 140 is formed of the same material, it may be an integral structure. By integrating the first bearing member 130 and the second bearing member 140, it is possible to further reduce the number of components, it is possible to reduce the manufacturing cost.

(Modification 2)

In the present embodiment, an example in which the cross-sectional shape is approximately elliptical rod-shaped member is used has been described. However, the present invention is not limited to this embodiment, the axis portion 110 may be a spherical member. That is, the axis portion 110 may be a structure in which a spherical portion is provided in a part of the key 100. In this case, for the first bearing member 130, for example, a member having a polygonal pyramid-shaped opening can be used. By making the shape of the opening functioning as the bearing into a polygonal pyramid (e.g., triangular pyramid, quadrangular pyramid, etc.), the axis portion 110 is in contact with the first bearing member 130 at a plurality of points (e.g., three points if the triangular pyramid, four points if the quadrangular pyramid). In this case, as well, the axis portion 110 may be pressed to the first bearing member 130 using the second bearing member 140.

(Modification 3)

In this embodiment, as shown in FIG. 9, an example in which the second bearing member 140 is a cantilever structure is shown. However, the present invention is not limited to this embodiment, and the second bearing member 140 can be a double-supported structure. The second bearing member 140 may be a member having a mesh-like (net-shaped) body. Further, the second bearing member 140 does not need to be an elastic member and may function as an elastic member by being combined with an elastic body such as a spring, a rubber, or the like. Thus, any member may be used for the second bearing member 140 as long as it is a member capable of giving elastic force to the axis portion 110.

(Modification 4)

In this embodiment, an example in which the second bearing member 140 is elastic. However, the present invention is not limited to this embodiment, and the axis portion 110 or the first bearing member 130 may be elastic. Further, the elastic member may be at least one of the axis portion 110, the first bearing member 130 and the second bearing member 140. That is, the plurality of members may be elastic. For example, both the first bearing member 130 and the second bearing member 140 may be elastic.

Next, in this embodiment, an example in which the positional relation between the axis portion and the bearing portion (the first bearing member and the second bearing member) in the support structure (the supporting portion) is different from the embodiment shown in FIG. 11 will be described. In the description of the present embodiment, a description will be given focusing on points different from the keyboard device 1 of the above-described embodiment. The same reference numerals are used to denote the same structures as those of the keyboard device 1 in the above-described embodiment, and descriptions thereof are omitted.

Figure 19:
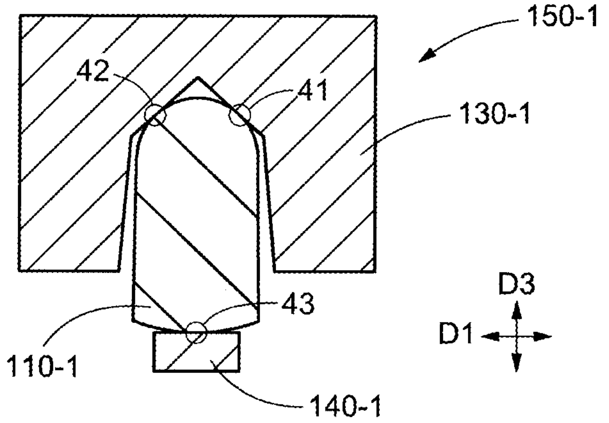
FIG. 19 is a cross-sectional view schematically illustrating a configuration of a supporting portion.

FIG. 19 is a cross-sectional view schematically illustrating a configuration of a supporting portion 150-1. The example shown in FIG. 19 is an example in which the bearing portion is provided on the key and the axis portion is provided on the frame in vice versa as in the aforementioned embodiment. The supporting portion 150-1 includes an axis portion 110-1, a first bearing member 130-1 and a second bearing member 140-1. The axis portion 110-1 is a part of the frame 500. The first bearing, the first bearing member 130-1 and the second bearing member 140-1 are both parts of the key 100. Further, although not shown, the first bearing member 130-1 and the second bearing member 140-1 are an integral member. However, not limited to this example, the first bearing member 130-1 and the second bearing member 140-1 may be separate members, respectively. The axis portion 110-1 is in contact with the first bearing member 130-1 or the second bearing member 140-1 at the contact points 41, 42 and 43, respectively.

Figure 20:
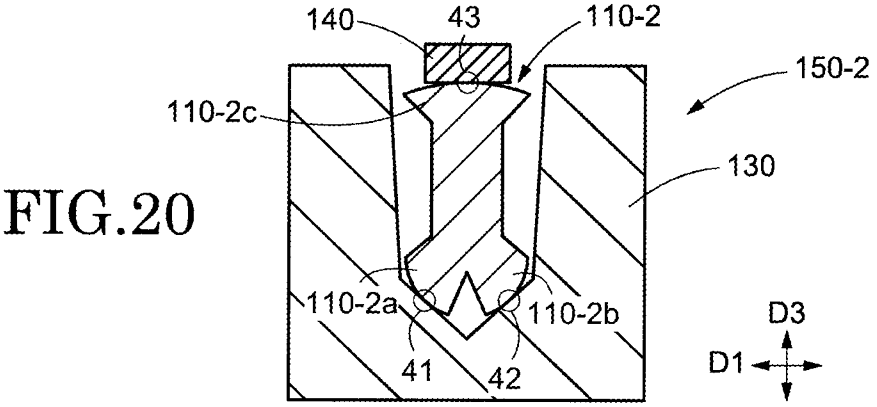
FIG. 20 is a cross-sectional view schematically illustrating a configuration of a supporting portion.

FIG. 20 is a cross-sectional view schematically illustrating a configuration of a supporting portion 150-2. The example shown in FIG. 20 is an example in which the form of the axis portion is different from that of the embodiment described above. The configurations of the first bearing member 130 and the second bearing member 140 are the same as those of the above-described embodiment. The supporting portion 150-2 includes an axis portion 110-2, the first bearing member 130 and the second bearing member 140. The axis portion 110-2 is a part of the key 100. As shown in FIG. 20, the axis portion 110-2 includes three portions 110-2*a* to 110-2*c*.

The axis portion 110-2 is in contact with the first bearing member 130 or the second bearing member 140 at the contact points 41, 42 and 43, respectively. Specifically, the axis portion 110-2 is in contact with the first bearing member 130 or the second bearing member 140 by each portions 110-2*a* to 110-2*c*. Each portions 110-2*a* to 110-2*c* has arcuate external forms in a cross-sectional view. That is, each portions 110-2*a* to 110-2*c* have curved surfaces, respectively.

Thus, the axis portion 110-2 may have an arcuate external form in the portion in contact with the first bearing member 130 or the second bearing member 140. That is, in the axis portion 110-2, is the shape other than the portion in contact with the first bearing member 130 or the second bearing member 140 is arbitrary.

Figure 21:
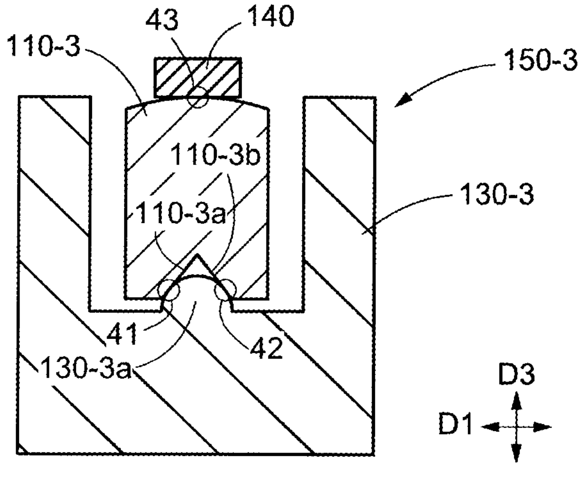
FIG. 21 is a cross-sectional view schematically illustrating a configuration of a supporting portion.

FIG. 21 is a cross-sectional view schematically illustrating a configuration of a supporting portion 150-3. The example shown in FIG. 21 is an example in which the shapes of the axis portion and the first bearing member is different from those of the aforementioned embodiment. The configuration of the second bearing member 140 is the same as that of the embodiment described above. The supporting portion 150-3 includes an axis portion 110-3, a first bearing member 130-3 and the second bearing member 140. The axis portion 110-3 is a part of the key 100. As shown in FIG. 21, the axis portion 110-3 has a linear first side 110-3*a* and a linear second side 110-3*b* in a cross-sectional view. The first bearing member 130-3 has a protrusion part 130-3*a* having a semicircular external form in a cross-sectional view. That is, the protrusion part 130-3*a* has a curved surface in the portion in contact with the axis portion 110-3.

The protrusion part 130-3*a* of the first bearing member 130-3 is in contact with the first side 110-3*a* and the second side 110-3*b* of the axis portion 110-3 at the contact point 41 and the contact point 42, respectively. In this case, the axis portion 110-3 rotates while contacting the first side 110-3*a* and the second side 110-3*b* to the protrusion part 130-3*a*.

As described above, the positional relation and the shape between the axis portion and the bearing portion (in particular the first bearing member) may have various embodiment. In any case, in the key support structure of the keyboard device 1 of the present embodiment, the axis portion and the bearing portion are in contact with each other at least at three points in a cross-sectional view. At this time, the external form of the member that slides intermittently at the respective contact points is the circular arc.

Here, the positional relationship between the contact point 41, the contact point 42, and the contact point 43 shown in FIGS. 19 to 21 satisfies a predetermined relationship. This point will be described referring to FIGS. 22 and 23.

Figure 22:
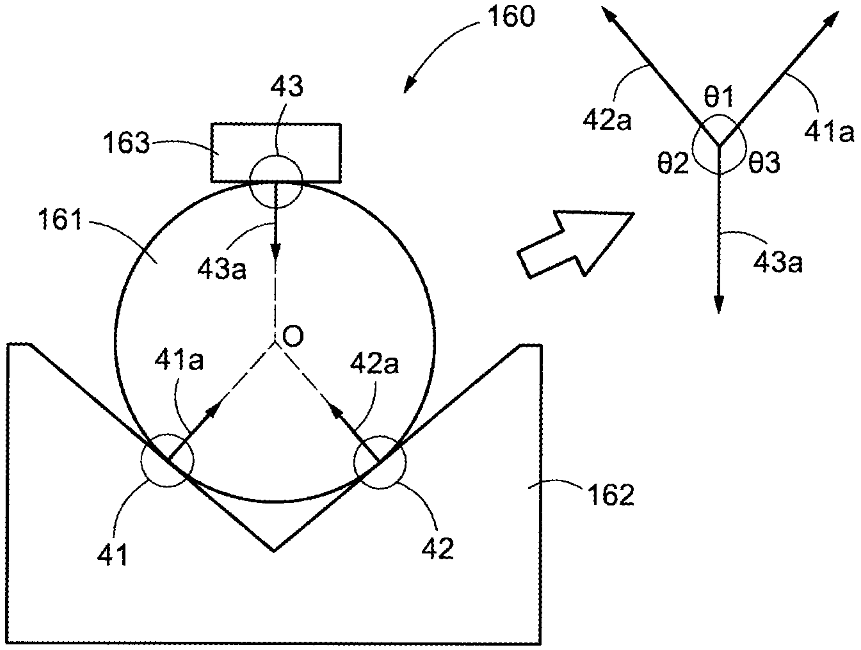
FIG. 22 is a diagram for explaining positional relation of each contact point of an axis portion, a first bearing member, and a second bearing member.

FIG. 22 is a diagram for explaining positional relation between the contact point 41, the contact point 42, and the contact point 43 of an axis portion 161, a first bearing member 162, and a second bearing member 163. A supporting portion 160 shown in FIG. 22 corresponds to the configuration of the supporting portion 150 shown in FIG. 11, the supporting portion 150-1 shown in FIG. 19, and the supporting portion 150-2 shown in FIG. 20. However, for convenience of explanation, in the example shown in FIG. 22 shows an example in which the axis portion 161 is circular in a cross-sectional view.

At the contact point 41 and the contact point 42, the axis portion 161 and the first bearing member 162 are in contact with each other. At the contact point 43, the axis portion 161 and the second bearing member 163 are in contact with each other. That is, in a cross-sectional view, the contact point 41, the contact point 42 and the contact point 43 are points on an arc that are the external form of the axis portion 161. Here, the contact point 41 is set as a starting point, and a normal vector toward the axis portion 161 (i.e., a normal vector from the contact point 41 toward the rotation center O of the axis portion 161) is set as a first normal vector 41*a*. Similarly, the contact point 42 and the contact point 43 are set as the starting points, and the normal vector toward the axis portion 161 is set as a second normal vector 42*a* and a third normal vector 43*a*, respectively. At this time, as shown in FIG. 22, when the starting points of each of the first normal vector 41*a*, the second normal vector 42*a*, and the third normal vector 43*a* are moved to one point, the angles θ1 to θ3 formed by the adjacent normal vectors are less than 180°.

Since the axis portion 161 is supported by the bearing portion composed of the first bearing member 162 and the second bearing member 163, the force received by the axis portion 161 from the first bearing member 162 or the second bearing member 163 is balanced at the contact point 41, the contact point 42 and the contact point 43. In other words, the supporting portion 160 shown in FIG. 22 has zero resultant vector of forces applied to the axis portion 161 from the first bearing member 162 and the second bearing member 163 at the contact points 41, 42 and 43.

Figure 23:
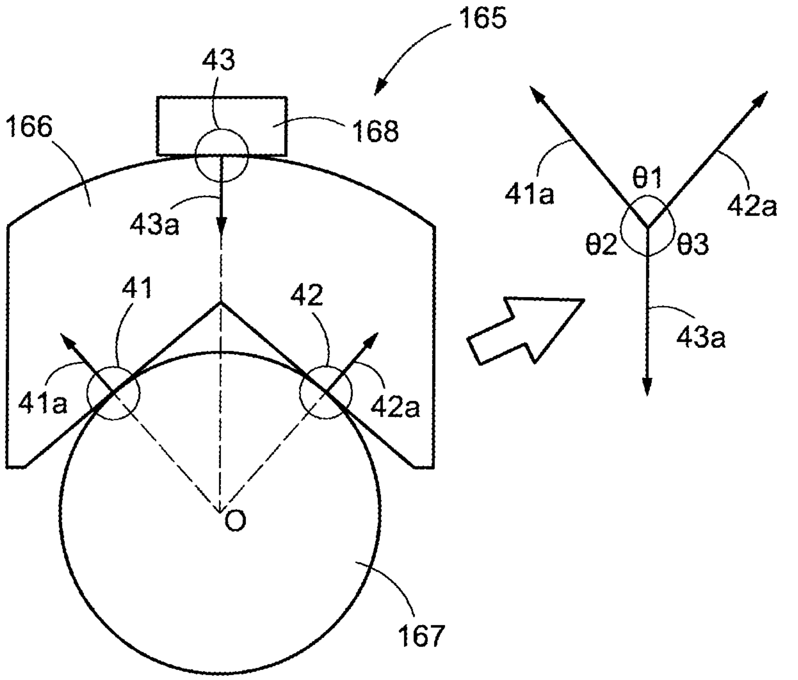
FIG. 23 is a diagram for explaining positional relation of each contact point of an axis portion, a first bearing member, and a second bearing member.

FIG. 23 is a diagram for explaining positional relation between the contact point 41, the contact point 42, and the contact point 43 of an axis portion 166, a first bearing member 167, and a second bearing member 168. A supporting portion 165 shown in FIG. 23 corresponds to the configuration of the supporting portion 150-3 shown in FIG. 21. However, for convenience of explanation, in the example shown in FIG. 23 shows an example in which the first bearing member 167 is circular in a cross-sectional view.

At the contact point 41 and the contact point 42, the axis portion 166 and the first bearing member 167 are in contact with each other. At the contact point 43, the axis portion 166 and the second bearing member 168 are in contact with each other. That is, in a cross-sectional view, the contact point 41 and the contact point 42 are points on the arc that is the external form of the first bearing member 167. In contrast, the contact point 43 is a point on the arc that is the external form of the axis portion 166. At this time, also in the example shown in FIG. 23, when the starting points of each of the first normal vector 41*a*, the second normal vector 42*a*, and the third normal vector 43*a* are moved to one point, the angles θ1 to θ3 formed by the adjacent normal vectors are less than 180°.

In the example shown in FIG. 23, the axis portion 166 is supported by the bearing portion composed of the first bearing member 167 and the second bearing member 168. Thus, in the example shown in FIG. 23, similarly to the example shown in FIG. 22, at the contact point 41, the contact point 42 and the contact point 43, the resultant vector of the force applied to the axis portion 166 from the first bearing member 167 and the second bearing member 168 is zero.

As described above, in the support structures (the supporting portions 150-1, 150-2 and 150-3) of the present embodiment, in a cross-sectional view, when the bearing portion (i.e., the first bearing member and the second bearing member) is in contact with the axis portion at three contact points, the respective contact points are located on the arc which is at least one of the external forms of the axis portion, the first bearing member and the second bearing member. When the starting points of each of the normal vector from the contact point toward the axis portion are moved to one point, the angle formed by each adjacent normal vector is less than 180°. Such a relationship is the same in the above-described embodiment.

According to the support structure of the present embodiment, it is possible to improve the external appearance of the keyboard device 1 by a simple support structure similarly to the above-described embodiment.

Next, in this embodiment, an example in which the support structure (the supporting portion) of the embodiment shown in FIG. 11 is rotated in the first direction, the second direction, or the third direction will be described. In the description of this embodiment, a description will be given focusing on points different from the keyboard device 1 of the above-described embodiment. The same reference numerals are used to denote the same structures as those of the keyboard device 1 in the above-described embodiment, and descriptions thereof are omitted.

Figure 24:
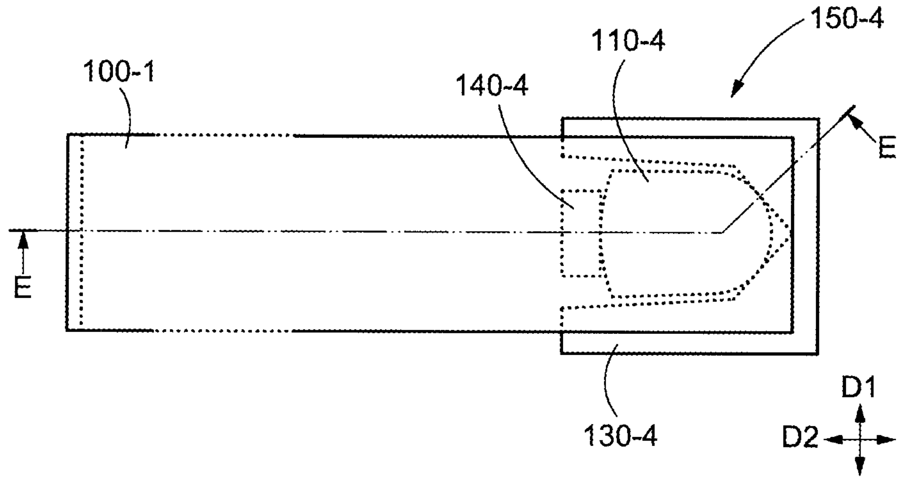
FIG. 24 is a plan view schematically illustrating a configuration of a supporting portion.
Figure 25:
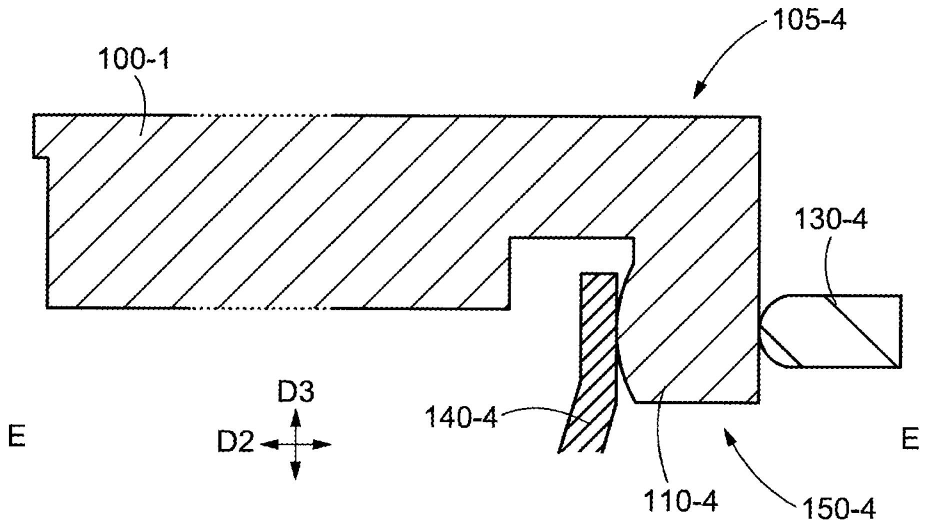
FIG. 25 is a cross-sectional view schematically illustrating a configuration of a supporting portion.

FIG. 24 is a plan view schematically illustrating a configuration of a supporting portion 150-4. FIG. 25 is a cross-sectional view schematically illustrating a configuration of the supporting portion 150-4. Specifically, FIG. 25 corresponds to a cross-sectional view in which a key 100-1 and the supporting portion 150-4 shown in FIG. 24 are cut along E-E line.

The examples shown in FIGS. 24 and 25 correspond to the configuration shown in FIGS. 12 and 13 in which the supporting portion 150 is rotated approximately 90° around the axis in the first direction. A key rear-end portion 105-4 of the key 100-1 bends downward (in the third direction) to constitute an axis portion 110-4. As shown in FIG. 25, the axis portion 110-4 is supported between a first bearing member 130-4 and a second bearing member 140-4 in the second direction. In the embodiment shown in FIGS. 24 and 25, the axis portion 110-4 rotates around the axis extending in the first direction and has a degree of freedom of movement in the rolling direction R and the yawing direction Y.

Figure 26:
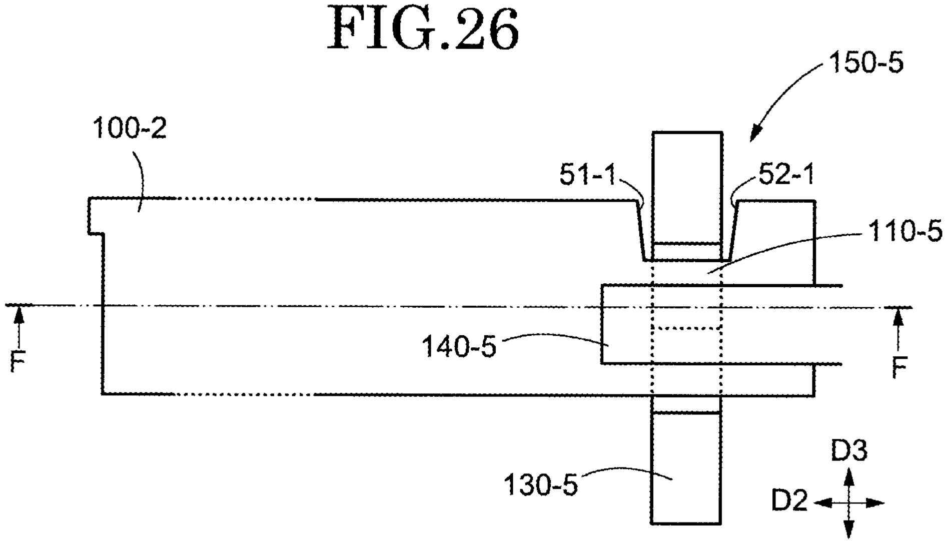
FIG. 26 is a side view schematically illustrating a configuration of a supporting portion.
Figure 27:
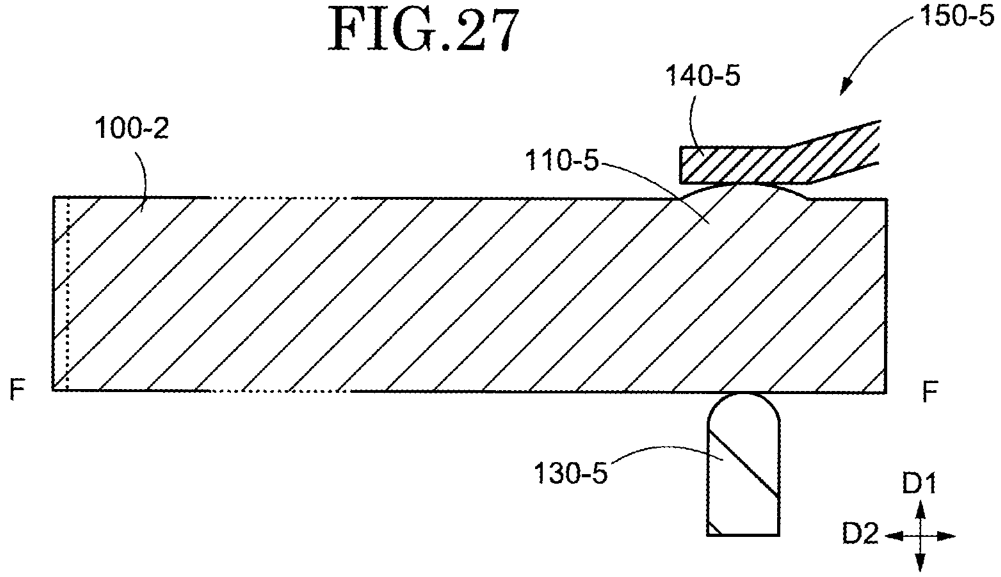
FIG. 27 is a cross-sectional view schematically illustrating a configuration of a supporting portion.

FIG. 26 is a side view schematically illustrating a configuration of a supporting portion 150-5. FIG. 27 is a cross-sectional view schematically illustrating a configuration of the supporting portion 150-5. Specifically, FIG. 27 corresponds to a cross-sectional view in which a key 100-2 and the supporting portion 150-5 shown in FIG. 26 are cut along F-F line.

The examples shown in FIGS. 26 and 27 correspond to the configuration in which the supporting portion 150 shown in FIGS. 12 and 13 is rotated approximately 90° around the axis in the second direction. An axis portion 110-5 is supported between a first bearing member 130-5 and a second bearing member 140-5 in the first direction. Further, the axis portion 110-5 is restricted from moving in the second direction by sandwiching the first bearing member 130-5 between a first positioning portion 51-1 and a second positioning portion 52-1. The inclination angle of the first positioning portion 51-1 and the second positioning unit 52-1 are determined within a range that does not interfere with the rotation of the key 100-2 by the key depression operation. In the embodiment shown in FIGS. 26 and 27, the axis portion 110-5 rotates around the axis extending in the first direction and has a degree of freedom of movement in the rolling direction R and the yawing direction Y.

Figure 28:
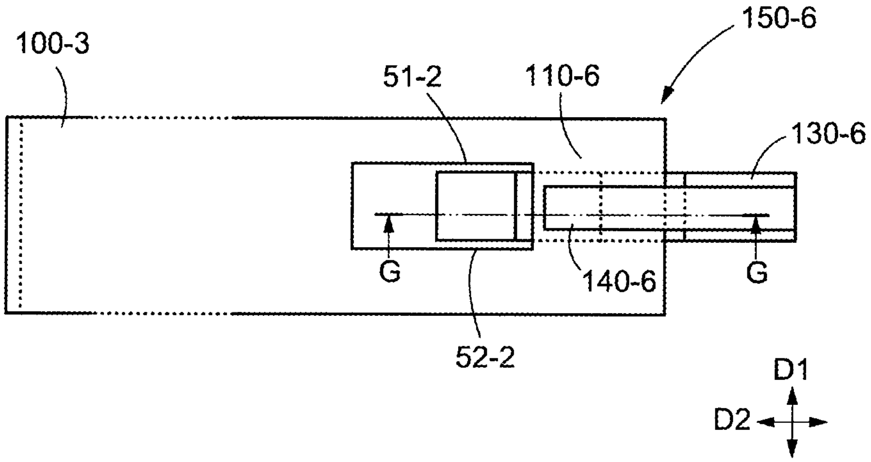
FIG. 28 is a plan view schematically illustrating a configuration of a supporting portion.
Figure 29:
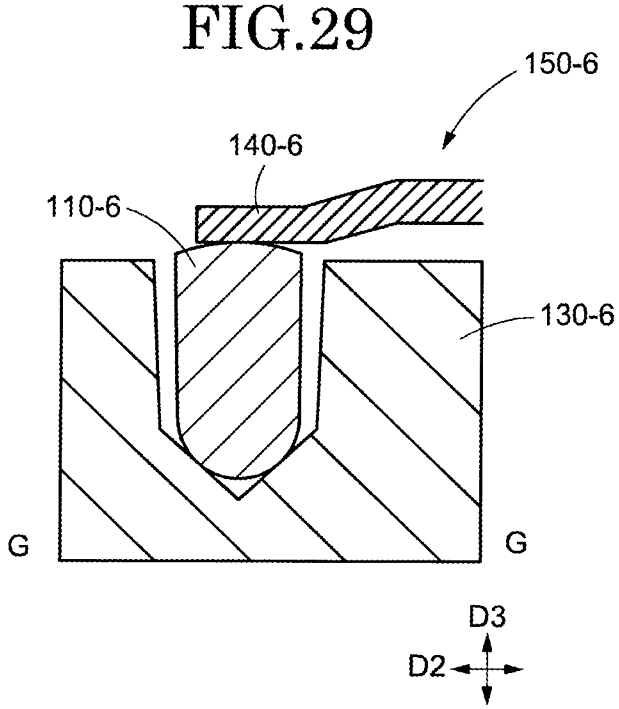
FIG. 29 is a cross-sectional view schematically illustrating a configuration of a supporting portion.

FIG. 28 is a plan view schematically illustrating a configuration of a supporting portion 150-6. FIG. 29 is a cross-sectional view schematically illustrating the configuration of the supporting portion 150-6. Specifically, FIG. 29 corresponds to a cross-sectional view in which a key 100-3 and the supporting portion 150-6 shown in FIG. 28 are cut along G-G line.

The examples shown in FIGS. 28 and 29 correspond to the configuration in which the supporting portion 150 shown in FIGS. 12 and 13 is rotated approximately 90° around the axis in the third direction. An axis portion 110-6 is supported between a first bearing member 130-6 and a second bearing member 140-6 in the third orientation. Further, the axis portion 110-6 is restricted from moving in the first direction by sandwiching the first bearing member 130-6 between a first positioning portion 51-2 and a second positioning portion 52-2. In the embodiment shown in FIGS. 28 and 29, the axis portion 110-6 rotates around the axis extending in the first direction and has a degree of freedom of movement in the rolling direction R and the yawing direction Y.

As described above, even when the key support structure (the supporting portion) of the keyboard device 1 is rotated in the first direction, the second direction, or the third direction, the external appearance of the keyboard device 1 can be improved by a simple support structure, similarly to the above-described embodiment. In the present embodiment has shown an example in which the support structure is rotated approximately 90°, the rotation angle is not limited to 90°.

According to the support structure of this embodiment, it is possible to improve the external appearance of the keyboard device 1 by a simple support structure similarly to the above-described embodiment.

Next, in this embodiment, a description will be given of an example in which the axis portion is the elastic support structure (the supporting portion) rather than the elastic bearing portion. In the description of this embodiment, a description will be given focusing on points different from the keyboard device 1 of the embodiment shown in FIG. 11. The same reference numerals are used to denote the same structures as those of the keyboard device 1 in the above-described embodiment, and descriptions thereof are omitted.

Figure 30:
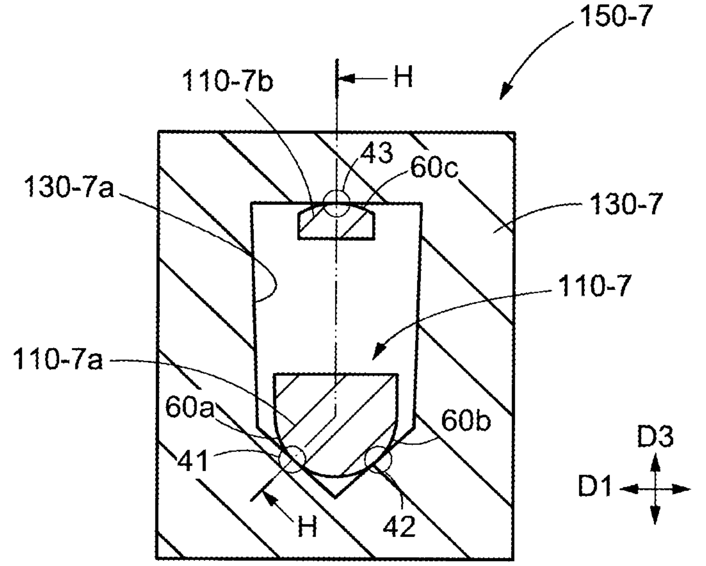
FIG. 30 is a cross-sectional view schematically illustrating a configuration of a supporting portion.
Figure 31:
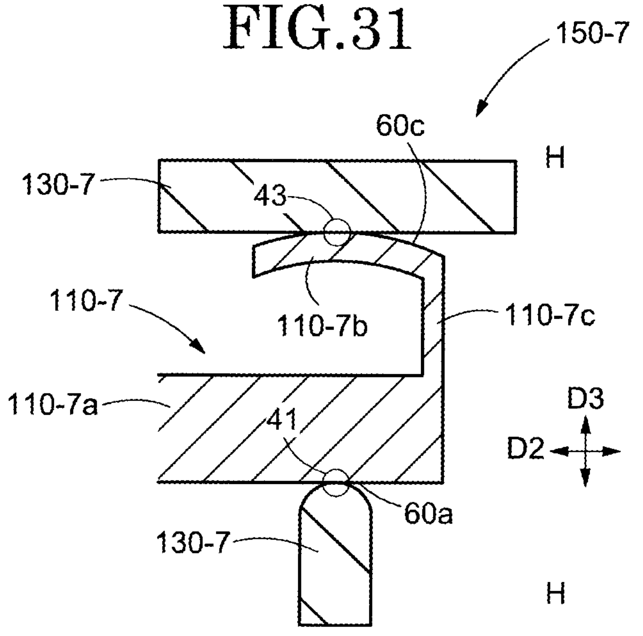
FIG. 31 is a cross-sectional view schematically illustrating a configuration of a supporting portion.

FIG. 30 is a cross-sectional view schematically illustrating a configuration of a supporting portion 150-7. FIG. 31 is a cross-sectional view schematically illustrating the configuration of the supporting portion 150-7. Specifically, FIG. 31 corresponds to a cross-sectional view in which the supporting portion 150-7 shown in FIG. 30 is cut along H-H line.

As shown in FIGS. 30 and 31, an axis portion 110-7 of the present embodiment includes a body portion **110-7*a*, an elastic portion 110-7*b* and a connecting portion 110-7*c*. The axis portion 110-7 is disposed inside an opening portion 130-7*a* provided in a first bearing member 130-7. The body portion 110-7*a* contacts the lower inner wall of the opening portion 130-7*a*, and the elastic portion 110-7*b* contacts the upper inner wall of the opening portion 130-7*a*. At this time, since the elastic force of the elastic portion 110-7*b* pushes the first bearing member 130-7 upward, a downward force is exerted on the body portion 110-7*a*. As a result, the body portion 110-7*a* is pressed to the lower inner wall of the opening portion 130-7*a***.

The body portion **110-7*a* has curved surfaces 60*a* and 60*b* in which the external form is an arc. As shown in FIG. 30, the curved surfaces 60*a* and 60*b* of the body portion 110-7*a* are in contact with the first bearing member 130-7 at the contact point 41 and the contact point 42. The structure at the contact point 41 and the contact point 42 in which the axis portion 110-7 and the first bearing member 130-7 are in contact with each other is the same structure as the aforementioned embodiment (e.g., referring to FIG. 11**).

The elastic portion **110-7*b* has a curved surface 60*c* in which the external form is an arc. As shown in FIGS. 30 and 31, the curved surface 60*c* of the elastic portion 110-7*b* is in contact with the first bearing member 130-7 at the contact point 43. The structure in a third contact point where the elastic portion 110-7*b* and the first bearing member 130-7 are in contact with each other is the same structure in which the axis portion 110 and the second bearing member 140 are in contact with each other in the aforementioned embodiment (e.g., referring to FIGS. 11 and 13**).

According to the support structure of this embodiment, it is possible to improve the external appearance of the keyboard device 1 by a simple support structure similarly to the above-described embodiment. Further, since the axis portion 110-7 has the elastic portion **110-7*b*, it is possible to reduce the manufacturing cost by reducing the number of components. In this embodiment, an example is shown in which the body portion 110-7*a*, the elastic portion 110-7*b*, and the connecting portion 110-7*c* are integrally formed. However, the present invention is not limited to this embodiment, and the body portion 110-7*a* and the elastic portion 110-7*b* may be a separate member and connected by the connecting portion 110-7*c***.

Next, in this embodiment, an example in which the form of the axis portion is different from that of the embodiment shown in FIG. 11 will be described. In the description of this embodiment, a description will be given focusing on points different from the keyboard device 1 of the above-described embodiment. The same reference numerals are used to denote the same structures as those of the keyboard device 1 in the above-described embodiment, and descriptions thereof are omitted.

Figure 32:
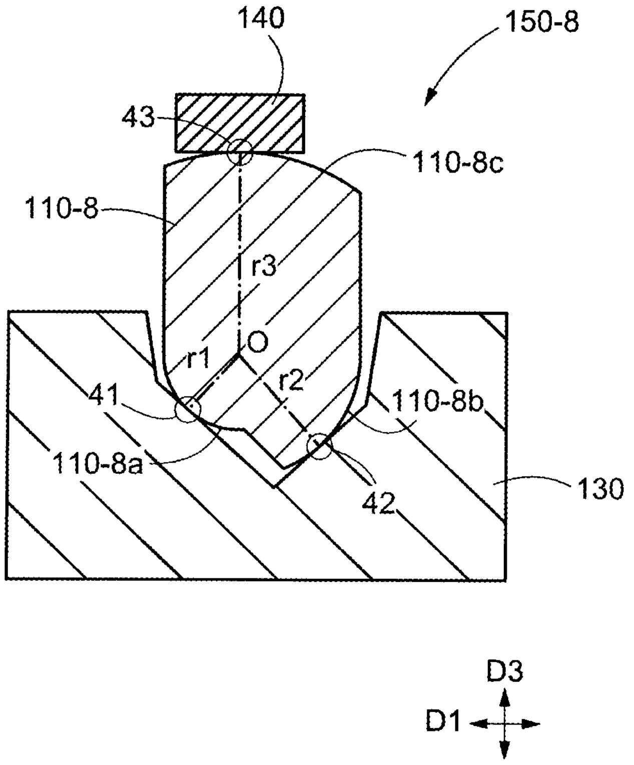
FIG. 32 is a cross-sectional view schematically illustrating a configuration of a supporting portion.

FIG. 32 is a cross-sectional view schematically illustrating a configuration of a supporting portion 150-8. FIG. 32 corresponds to a cross-sectional view described referring to FIG. 11 in the embodiment described above. In the supporting portion 150-8, an axis portion 110-8 has a curved surface **110-8*a*, a curved surface 110-8*b*, and a curved surface 110-8*c*. The curved surface 110-8*a* is in contact with the first bearing member 130 at the contact point 41. The curved surface 110-8*b* is in contact with the first bearing member 130 at the contact point 42. The curved surface 110-8*c* is in contact with the second bearing member 140 at the contact point 43. At the contact point 41, the contact point 42 and the contact point 43, the external form of the axis portion 110-8 is arcuate. That is, the contact point 41, the contact point 42 and the contact point 43 are points on the arc which is the external form of the axis portion 110**.

In this embodiment, the radius r1 of the arc having the contact point 41, the radius r2 of the arc having the contact point 42, and the radius r3 of the arc having the third contact point are different from each other. However, the arc having the contact point 41, the arc having the contact point 42, and the arc having the contact point 43 are arcs having the same center O. Therefore, the axis portion 110-8 is rotatable with the center O as the pivot point. That is, the axis portion 110-8 has a degree of freedom of movement in the rolling direction R.

According to the support structure of this embodiment, it is possible to improve the external appearance of the keyboard device 1 by a simple support structure similarly to the above-described embodiment.

Next, in this embodiment, an example in which the configuration of the positioning portion determining the longitudinal position of the axis portion is different from that of the embodiment described above. In the description of this embodiment, a description will be given focusing on points different from the keyboard device 1 of the above-described embodiment. The same reference numerals are used to denote the same structures as those of the keyboard device 1 in the above-described embodiment, and descriptions thereof are omitted.

Figure 33:
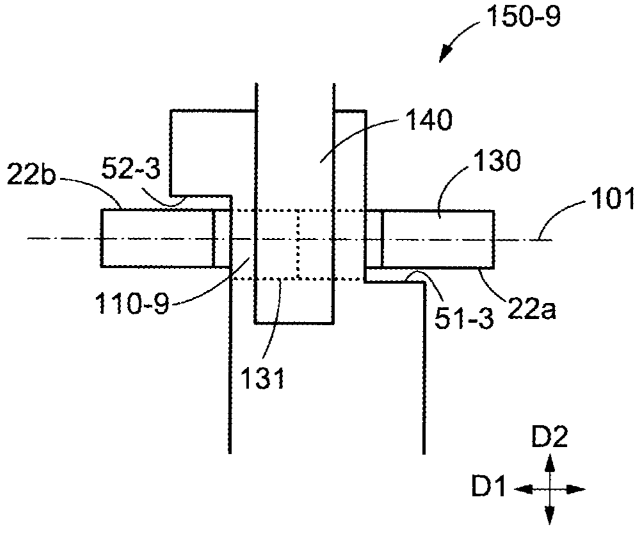
FIG. 33 is a plan view schematically illustrating a configuration of a supporting portion.

FIG. 33 is a plan view schematically illustrating a configuration of a supporting portion 150-9. FIG. 33 corresponds to a plan view described referring to FIG. 14 in the embodiment described above. In the embodiment described above, the first positioning portion 51 and the second positioning portion 52 are arranged to face each other with the rotational axis of the axis portion 110 interposed therebetween. In contrast, in the example shown in FIG. 33, a first positioning portion 51-3 and a second positioning portion 52-3 are provided at different positions in the first direction. That is, in the supporting portion 150-9, the first positioning portion 51-3 and the second positioning portion 52-3 are not overlapped in the second direction.

In a plan view shown in FIG. 33, there is a gap between the first positioning portion 51-3 and the front inclined portion 22*a*. However, in practice, as described referring to FIG. 15 in the above embodiment, the first positioning portion 51-3 and the front inclined portion 22*a* are in contact with each other. Therefore, the first positioning portion 51-3 can restrict the backward movement of the axis portion 110-9. Similarly, since the second positioning portion 52-3 and the rear inclined portion 22*b* are in contact with each other, the second positioning portion 52-3 can also restrict the forward movement of the axis portion 110-9.

Figure 34:
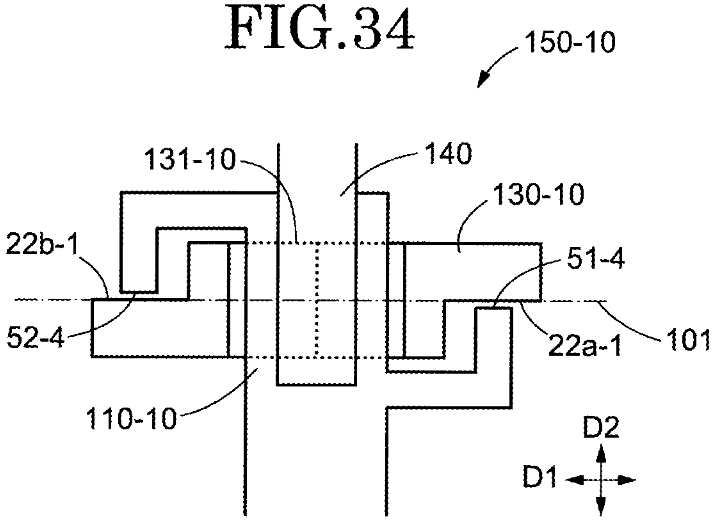
FIG. 34 is a plan view schematically illustrating a configuration of a supporting portion.

FIG. 34 is a plan view schematically illustrating a configuration of a supporting portion 150-10. In the example shown in FIG. 34, a first positioning portion 51-4 of an axis portion 110-10 and a front inclined portion 22*a*-1 of a first bearing member 130-10 are in contact with each other at a position (or close position) overlapping the axis of the rotational axis 101. In a plan view shown in FIG. 34, there is a gap between the first positioning portion 51-4 and the front inclined portion 22*a*-1. However, in practice, as described above, the first positioning portion 51-4 and the front inclined portion 22*a*-1 are in contact with each other. Similarly, a second positioning portion 52-4 also contacts at a position overlapping the axis of a rear inclined portion 22*b*-1 and the rotational axis 101 (or close position). Therefore, the first positioning portion 51-4 can restrict the backward movement of the axis portion 110-10. Similarly, since the second positioning portion 52-4 and the rear inclined portion 22*b*-1 are in contact with each other, the second positioning portion 52-4 can also restrict the forward movement of the axis portion 110-10.

In the embodiment shown in FIG. 34, the axis portion 110-10 and the first bearing member 130-10 are in contact with each other at a position (or close position) overlapping the axis of the rotational axis 101. In this case, even if the axis portion 110-10 rotates around the rotational axis 101, the anterior-posterior positional relation will not change at the contact point between the axis portion 110-10 and the first bearing member 130-10. That is, even if the axis portion 110-10 rotates, there is no gap between the axis portion 110-10 and the first bearing member 130-10. Therefore, according to the structure shown in FIG. 34, it is possible to restrict the movement of the axis portion 110-10 toward the anterior-posterior direction with higher accuracy.

Also, in the example shown in FIG. 34, the first positioning portion 51-4 and the second positioning portion 52-4 are provided at different positions in the first direction. That is, in the supporting portion 150-10, the first positioning portion 51-4 and the second positioning portion 52-4 are not overlapped in the second direction.

According to the support structure of this embodiment, it is possible to improve the external appearance of the keyboard device 1 by a simple support structure similarly to the above-described embodiment.

Next, in this embodiment, an example in which the configuration of the positioning portion determining the longitudinal position of the axis portion is different from that of the above-described embodiment. In the description of this embodiment, a description will be given focusing on points different from the keyboard device 1 of the above-described embodiment. The same reference numerals are used to denote the same structures as those of the keyboard device 1 in the above-described embodiment, and descriptions thereof are omitted.

Figure 35:
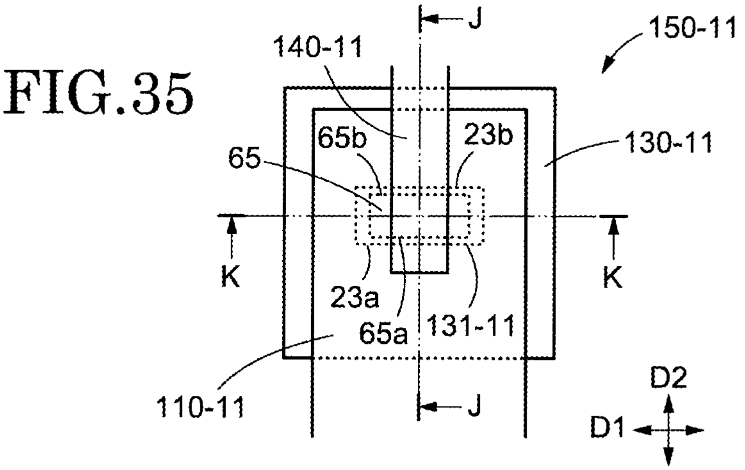
FIG. 35 is a plan view schematically illustrating a configuration of a supporting portion.
Figure 36:
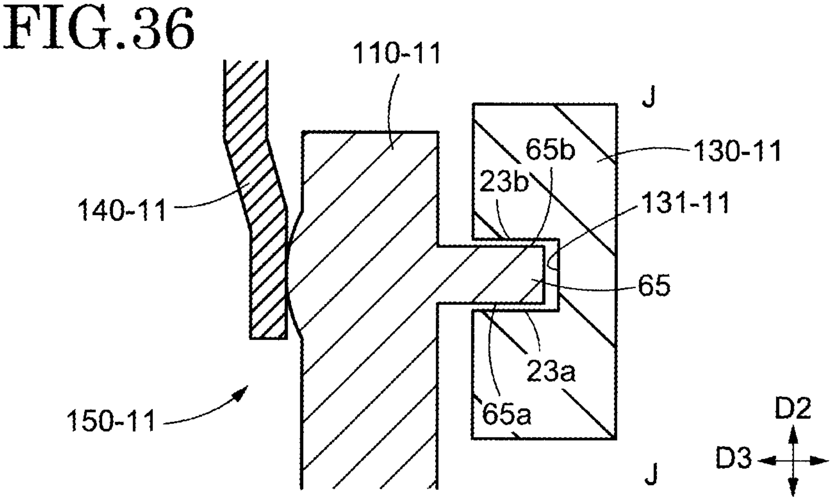
FIG. 36 is a cross-sectional view schematically illustrating a configuration of a supporting portion.
Figure 37:
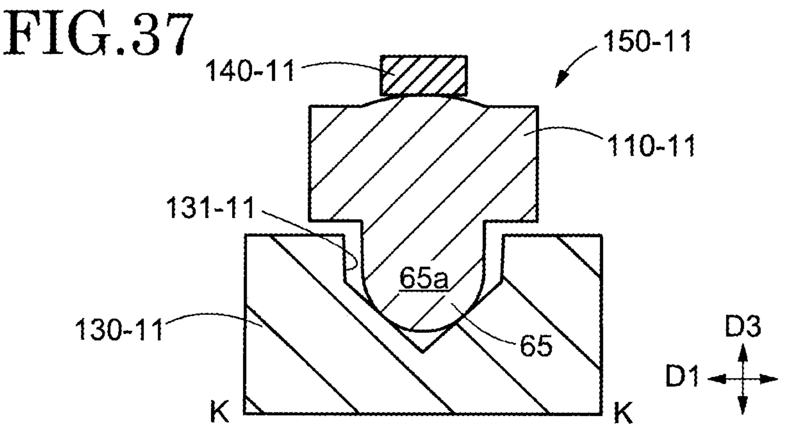
FIG. 37 is a cross-sectional view schematically illustrating a configuration of a supporting portion.

FIG. 35 is a plan view schematically illustrating a configuration of a supporting portion 150-11. FIG. 36 and FIG. 37 are cross-sectional views schematically illustrating the configuration of the supporting portion 150-11. Specifically, FIG. 36 corresponds to a cross-sectional view in which the supporting portion 150-11 shown in FIG. 35 is cut along J-J line. FIG. 37 corresponds to a cross-sectional view in which the supporting portion 150-11 shown in FIG. 35 is cut along K-K line.

As shown in FIGS. 35 to 37, an axis portion 110-11 has a protrusion portion 65 protruding in the third direction. A first bearing member 130-11 has a groove portion 131-11. As shown in FIG. 36, when the axis portion 110-11 is combined with the first bearing member 130-11, the protrusion portion 65 is inserted into the groove portion 131-11. At this time, a first surface 23*a* and a second surface 23*b* of the inner wall of the groove portion 131-11 that are approximately orthogonal to the second direction, respectively, faces a first surface 65*a* and a second surface 65*b* of the protrusion portion 65 that are approximately orthogonal to the second direction. Therefore, the axis portion 110-11 is restricted to move to the anterior-posterior direction.

Figure 38:
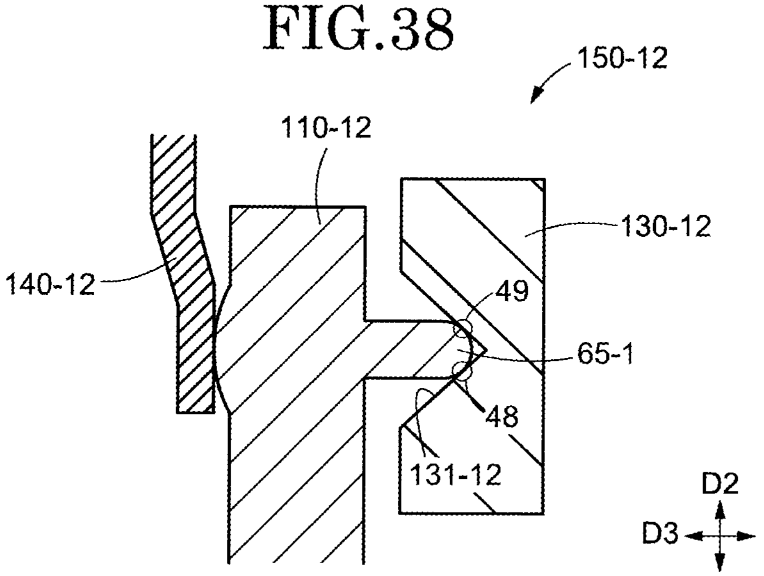
FIG. 38 is a cross-sectional view schematically illustrating a configuration of a supporting portion in a modification.

FIG. 38 is a cross-sectional view schematically illustrating a configuration of a supporting portion 150-12. Specifically, this corresponds to the modification of the cross-sectional view shown in FIG. 36. As shown in FIG. 38, an axis portion 110-12 has a protrusion portion 65-1 protruding in the third direction. In the embodiment shown in FIG. 38, a tip of the protrusion portion 65-1 has a semicircular shape. Further, a first bearing member 130-12 has an approximately triangular groove portion 131-12 in a cross-sectional view. When combining the axis portion 110-12 and the first bearing member 130-12, the protrusion portion 65-1 is inserted into the groove portion 131-12. At this time, in a cross-sectional view, the tip of the protrusion portion 65-1 is in contact with the inner wall of the groove portion 131-12 at a contact point 48 and a contact point 49. Therefore, the axis portion 110-12 is restricted to move to the anterior-posterior direction.

According to the support structure of this embodiment, it is possible to improve the external appearance of the keyboard device 1 by a simple support structure similarly to the above-described embodiment.

The support structure described in the above embodiments are applied as the key support structure of the keyboard device. However, the present invention is not limited to these embodiments and is also applicable to the support structure of the rotation member other than the key in the keyboard device. For example, it may be applied as a hammer support structure of the keyboard device.

One embodiment of the present disclosure will be briefly summarized below.

A key support structure of a keyboard device according to an embodiment of the present disclosure includes a first member and a second member that supports the first member. The first member is pivotal about a first axis that extends in a first direction and movable with a degree of freedom of movement in a rolling direction, which is a direction of rotation around a second axis extending in a second direction that is substantially orthogonal to the first direction. the second member restricts a movement of the first member in the first direction, while pivotally supporting the first member about the first axis. The support structure can also be configured as follows.

The first member may have a degree of freedom of movement in a yawing direction accompanied that changes positions of the contacts of the first member and the second member.

The keyboard may include a key. The first member may be a part of the key.

A key support structure of the keyboard device according to an embodiment of the present disclosure includes a first member, a second member contacting the first member at a first contact point and a second contact point, and a third member contacting the first member at a third contact point. At least one member, among the first member, the second member, and the third member, is slideable at one contact, among the first contact, second contact, and third contact. In a state where a first normal vector at the first contact point, a second normal vector at the second contact point, and the third normal vector intersect at a common point, an angle between a pair of neighboring normal vectors, among the first, second, and third vectors, is less than 180 degrees. The support structure can also be configured as follows.

At least one of the first member, the second member, or the third member may be elastic.

The third member may be connected to or integrated with the second member.

The first member may be a rotational member.

The rotational member may include positioning portions that determine a longitudinal position of the rotational member. A rotational axis of the rotational member may be located between the positioning portions. The positioning portions may be separated from each other from the rotational axis.

The rotational member may include positioning portions that determine a longitudinal position of the rotational member. A rotational axis of the rotational member may be located between the positioning portions. The positioning portions contact the second member on the rotational axis of the rotational member.

The first member may include an arc surface at at least one of the first contact, the second contact, or the third contact.

The first member may include an arc surface at each of the first contact, the second contact, and the third contact. Each of the first, second, and third vectors may intersect a center of one of the respective arc surfaces.

Each of the arc surfaces may have a same radius of curvature.

A key support structure of the keyboard device according to an embodiment of the present disclosure includes a first member, a second member contacting the first member at a first contact point and a second contact point, and a third member contacting the third member at a third contact point. the second member and the third member support the first member at the first contact point, the second contact point, and the third contact point. The support structure can also be configured as follows.

At least one of the first member, the second member, or the third member may be elastic.

The first member may be a rotational member (rotatable member).

The rotational member may have positionings portion that determine a longitudinal position of the rotational member. A rotational axis of the rotational member is located between the positioning portions. The positioning portions are separated from each other from the rotational axis.

The rotational member may have positioning portions that determine a longitudinal position of the rotational member. A rotational axis of the rotational member is located between the positioning portions. The positioning portions contact the second member on the rotational axis of the rotational member.

The third member may be connected to or integrated with the second member.

A keyboard device according to an embodiment of the present disclosure may have a frame, a key and the key support structure(s) described above. The first member may be a part of the key. The second member may be a part of the frame.

An electronic musical instrument according to an embodiment of the present disclosure may have the keyboard device described above and a sound output device.

As long as the gist of the present disclosure is provided, it is within the scope of the present disclosure that a skill in art adds, deletes, or modifies a design of a component or adds, omits, or modifies a process based on the configuration described above as an embodiment of the present disclosure. The above-described embodiments or modifications can be appropriately combined as long as they are not mutually contradictory. Technical matters common to each embodiment are included in each embodiment even if they are not explicitly described.

It is to be understood that other operational effects different from those provided by the aspects of the respective embodiments or modifications described above are naturally brought about by the present disclosure for those apparent from the description herein or those which can be easily predicted by those skilled in the art.

What is claimed is:

1. A key support structure for a key of a keyboard device, the key support structure comprising:

a first member integral with the key and disposed at a rear end side of the key, the rear end side being disposed at a hidden portion of the key that is disposed behind an appearance portion of the key that is touchable by a player to press the key; and a second member that supports the first member, wherein the first member is:

pivotal about a first axis that extends in a first direction;

movable with a degree of freedom of movement in a rolling direction, which is a direction of rotation around a second axis extending in a second direction that is substantially orthogonal to the first direction, and wherein the second member:

restricts a movement of the first member in the first direction, while pivotally supporting the first member about the first axis; and contacts the first member at a first contact point and a second contact point, and wherein the first member has a degree of freedom of movement in a yawing direction that changes positions of the first and second contact points.

2. A keyboard device comprising:

a frame;

the key support structure according to claim 1; and the key, wherein the second member is part of the frame.

3. An electronic musical instrument comprising:

the keyboard device according to claim 2; and a sound output device.

4. A key support structure for a key of a keyboard device, the key support structure comprising:

a first member integral with the key and disposed at a rear end side of the key, the rear end side being disposed at a hidden portion of the key that is disposed behind an appearance portion of the key that is touchable by a player to press the key;

a second member contacting the first member at a first contact point and a second contact point; and a third member contacting the first member at a third contact point, wherein at least one member, among the first member, the second member, and the third member, is slideable at one contact point, among the first, second, and third contact points, and wherein, in a state where a first normal vector at the first contact point, a second normal vector at the second contact point, and a third normal vector at the third contact point intersect at a common point, an angle between a pair of neighboring normal vectors, among the first, second, and third vectors, is less than 180 degrees, and wherein the first member has a degree of freedom of movement in a yawing direction that changes positions of the first and second contact points.

5. The key support structure according to claim 4, wherein at least one of the first member, the second member, or the third member is elastic.

6. The key support structure according to claim 4, wherein the third member is connected to or integrated with the second member.

7. The key support structure according to claim 4, wherein the first member, including the key, is a rotatable about a rotational axis.

8. The key support structure according to claim 7, wherein:

the first member includes positioning portions that determine a longitudinal position of the first member, the rotational axis of the first member is located between the positioning portions, and the positioning portions are separated from each other from the rotational axis.

9. The key support structure according to claim 7, wherein:

the first member includes positioning portions that determine a longitudinal position of the first member, and the rotational axis of the first member is located between the positioning portions, and the positioning portions contact the second member on the rotational axis of the first member.

10. The key support structure according to claim 4, wherein the first member includes an arc surface at least one of the first contact, the second contact, or the third contact.

11. The key support structure according to claim 4, wherein:

the first member includes an arc surface at each of the first contact, the second contact, and the third contact, and each of the first, second, and third vectors intersect a center of one of the respective arc surfaces.

12. The key support structure according to claim 11, wherein each of the arc surfaces has a same radius of curvature.

13. A keyboard device comprising:

a frame;

the key support structure according to claim 4; and the key, wherein the second member is part of the frame.

14. An electronic musical instrument comprising:

the keyboard device according to claim 13; and a sound output device.

15. A key support structure for a key of a keyboard device, the key support structure comprising:

a first member integral with the key and disposed at a rear end side of the key, the rear end side being disposed at a hidden portion of the key that is disposed behind an appearance portion of the key that is touchable by a player to press the key;

a second member contacting the first member at a first contact point and a second contact point; and a third member contacting the first member at a third contact point, wherein the second member and the third member support the first member at the first contact point, the second contact point, and the third contact point, and wherein the first member has a degree of freedom of movement in a yawing direction that changes positions of the first and second contact points.

16. The key support structure according to claim 15, wherein at least one of the first member, the second member, or the third member is elastic.

17. The key support structure according to claim 15, wherein the first member, including the key, is rotatable about a rotational axis.

18. The key support structure according to claim 17, wherein:

the first member includes positioning portions that determine a longitudinal position of the rotational member, the rotational axis of the first member is located between the positioning portions, and the positioning portions are separated from each other from the rotational axis.

19. The key support structure according to claim 17, wherein:

the first member includes positioning portions that determine a longitudinal position of the first member, the a rotational axis of the first member is located between the positioning portions, and the positioning portions contact the second member on the rotational axis of the first member.

20. The key support structure according to claim 15, wherein the third member is connected to or integrated with the second member.

21. A keyboard device comprising:

a frame;

the key support structure according to claim 15; and the key, wherein the second member is part of the frame.

22. An electronic musical instrument comprising:

the keyboard device according to claim 21, and a sound output device.

* * * * *